(12) United States Patent
Snider

(10) Patent No.: US 8,180,065 B2
(45) Date of Patent: May 15, 2012

(54) ACOUSTICAL WINDOW ASSEMBLY FOR VEHICLE

(75) Inventor: Darin J. Snider, Holland, MI (US)

(73) Assignee: Magna Mirrors of America, Inc., Holland, MI (US)

(*) Notice: Subject to any disclaimer, the term of this patent is extended or adjusted under 35 U.S.C. 154(b) by 1054 days.

(21) Appl. No.: 12/088,560

(22) PCT Filed: Oct. 12, 2006

(86) PCT No.: PCT/US2006/040100
§ 371 (c)(1),
(2), (4) Date: Mar. 28, 2008

(87) PCT Pub. No.: WO2007/047442
PCT Pub. Date: Apr. 26, 2007

(65) Prior Publication Data
US 2008/0232609 A1    Sep. 25, 2008

Related U.S. Application Data

(60) Provisional application No. 60/726,343, filed on Oct. 13, 2005.

(51) Int. Cl.
*H04B 1/00* (2006.01)
(52) U.S. Cl. .......................................................... 381/86
(58) Field of Classification Search .................... 381/86, 381/87, 306, 334, 344, 345, 336, 152, 190, 381/423, 424, 425
See application file for complete search history.

(56) References Cited

U.S. PATENT DOCUMENTS

| 3,107,746 A | | 10/1963 | Namon |
| 4,514,599 A | * | 4/1985 | Yanagishima et al. ........ 381/152 |
| 5,551,197 A | | 9/1996 | Repp et al. |
| 5,793,877 A | | 8/1998 | Tagg |
| 5,812,684 A | | 9/1998 | Mark |
| 5,838,805 A | | 11/1998 | Warnaka et al. |
| 5,853,895 A | | 12/1998 | Lewno |
| 5,923,765 A | * | 7/1999 | Elliott ............................. 381/86 |
| 6,023,123 A | | 2/2000 | Petiet |

(Continued)

FOREIGN PATENT DOCUMENTS

EP    0964387    12/1999

(Continued)

OTHER PUBLICATIONS

International Search Report and Written Opinion for PCT Application No. PCT/US2008/082583, filed Nov. 6, 2008.

(Continued)

*Primary Examiner* — Dao H Nguyen
*Assistant Examiner* — Tram H Nguyen
(74) *Attorney, Agent, or Firm* — Gardner, Linn, Burkhart & Flory, LLP

(57) ABSTRACT

A window assembly for a vehicle includes a window panel (14), an actuating assembly (24) and a seal (22). The frame portion (16) partially surrounds a perimeter of the window panel and leaves a free perimeter portion (14c) of the window panel (14) at least partially free. The actuating assembly (24) is positioned at or near the free perimeter portion (14c) of the window panel (14) and is operated to vibrate the window panel. The seal (22) is disposed along the free perimeter portion to substantially seal the window panel relative to the vehicle panel while allowing movement of the window panel in response to the actuating assembly.

13 Claims, 19 Drawing Sheets

U.S. PATENT DOCUMENTS

| | | | |
|---|---|---|---|
| 6,195,440 B1 | 2/2001 | Warnaka et al. |
| 6,218,766 B1 | 4/2001 | Warnaka et al. |
| 6,220,650 B1 | 4/2001 | Davis et al. |
| 6,299,235 B1 | 10/2001 | Davis et al. |
| 6,356,641 B1 | 3/2002 | Warnaka et al. |
| 6,394,529 B2 | 5/2002 | Davis et al. |
| 6,522,755 B1 | 2/2003 | Warnaka et al. |
| 6,522,760 B2 | 2/2003 | Azima et al. |
| 6,572,176 B2 | 6/2003 | Davis et al. |
| 6,669,267 B1 | 12/2003 | Lynam et al. |
| 6,729,674 B2 | 5/2004 | Davis et al. |
| 6,811,372 B1 | 11/2004 | Emborg et al. |
| 6,839,444 B2 | 1/2005 | Ellis et al. |
| 6,845,162 B1 | 1/2005 | Emborg et al. |
| 6,865,227 B2 | 3/2005 | Chan |
| 6,904,154 B2 | 6/2005 | Azima et al. |
| 7,247,976 B2 | 7/2007 | Sashida et al. |
| 2006/0048452 A1 | 3/2006 | Sweeney et al. |
| 2006/0106500 A1 | 5/2006 | Allaei |
| 2007/0057601 A1 | 3/2007 | Kawase et al. |
| 2007/0216123 A1 | 9/2007 | Gustavsson |
| 2007/0242844 A1 | 10/2007 | Harman |
| 2010/0290639 A1 * | 11/2010 | Snider et al. .................. 381/86 |

FOREIGN PATENT DOCUMENTS

| EP | 1414266 | 4/2004 |
| WO | WO 2007047442 | 4/2007 |

OTHER PUBLICATIONS

International Search Report and Written Opinion for PCT Application No. PCT/US06/40100.

* cited by examiner

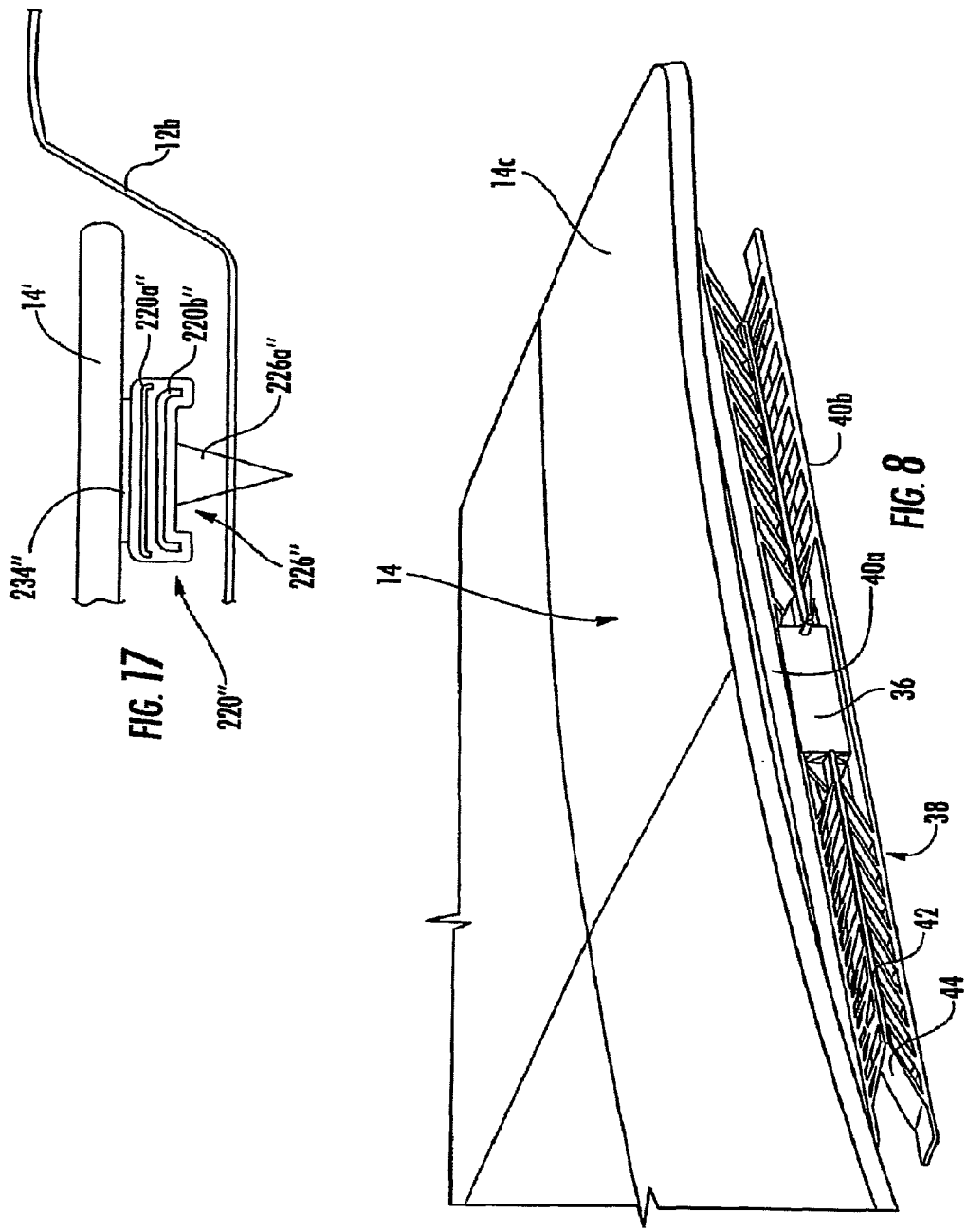

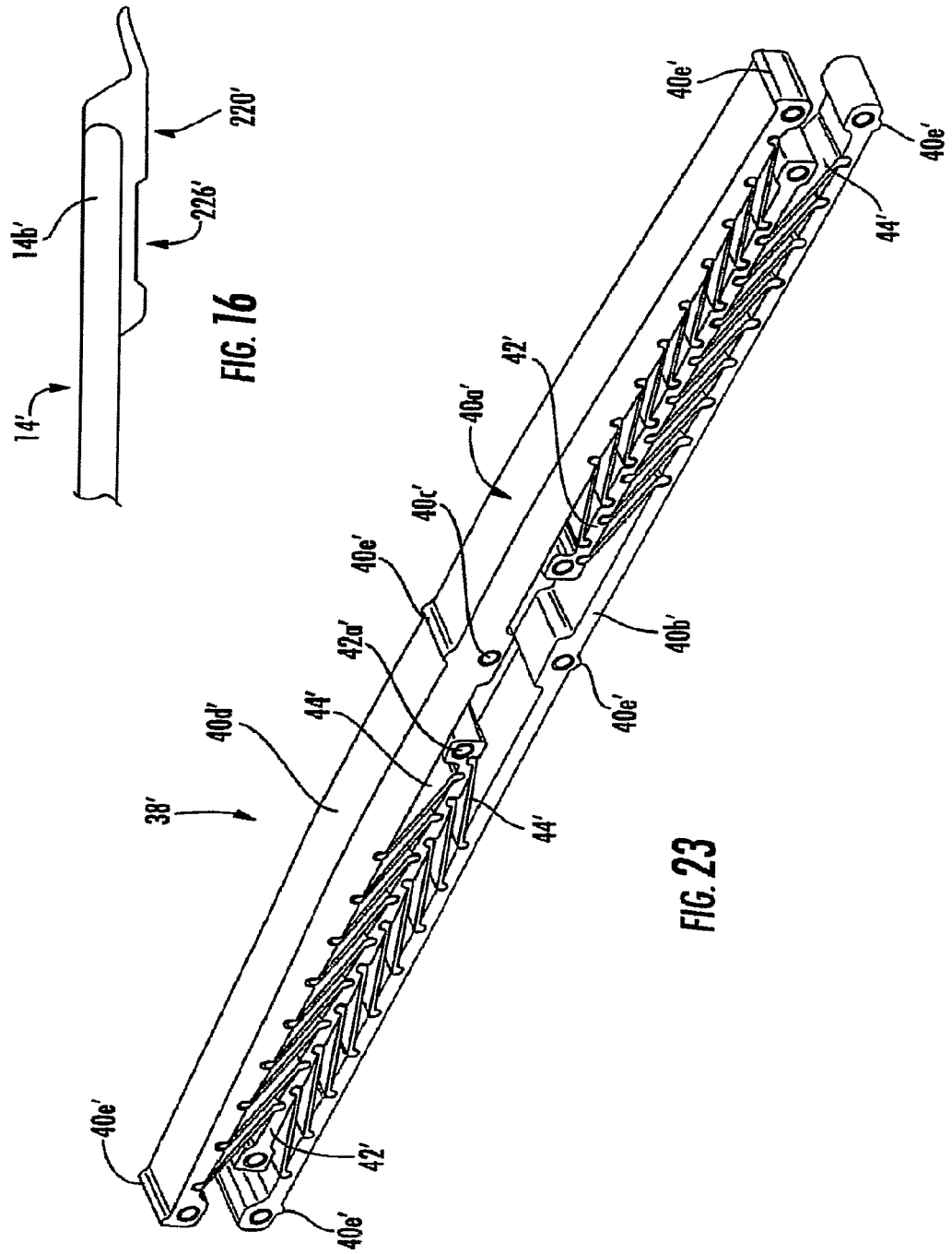

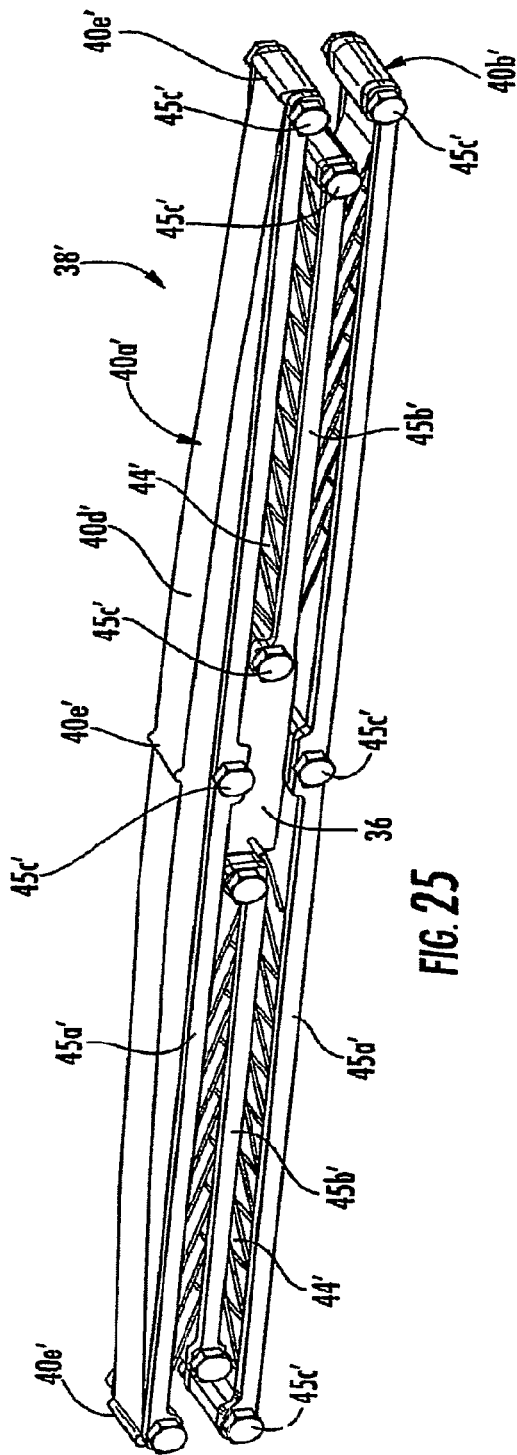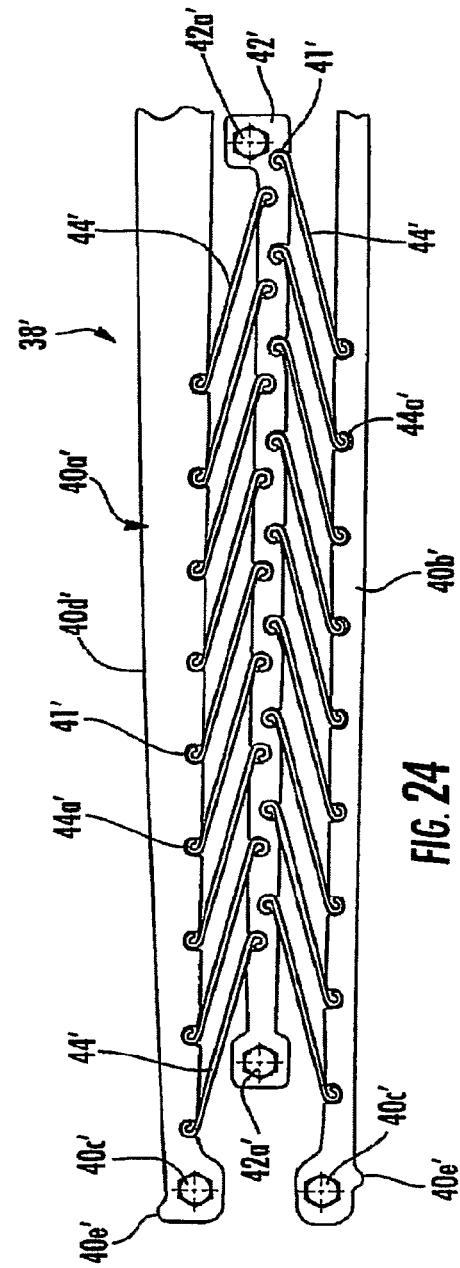

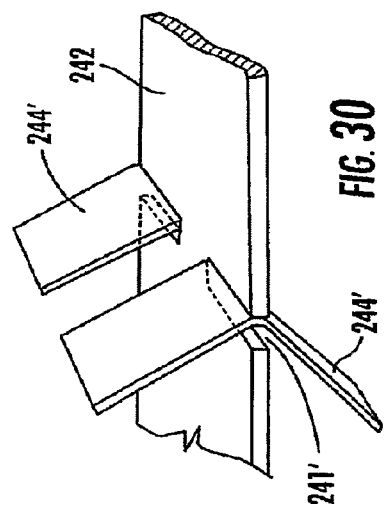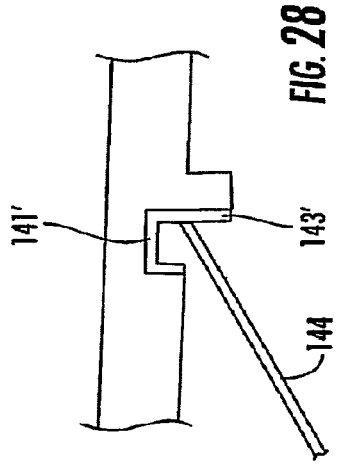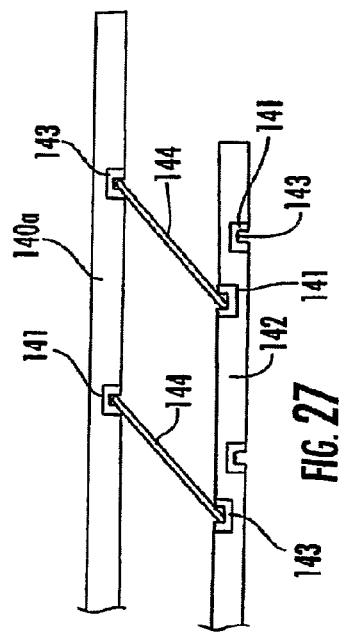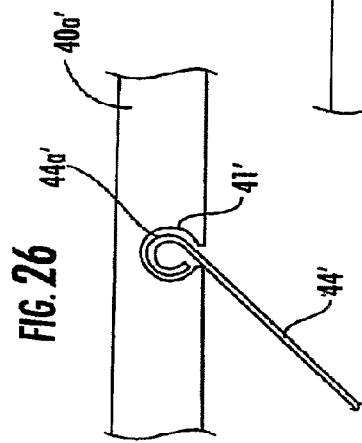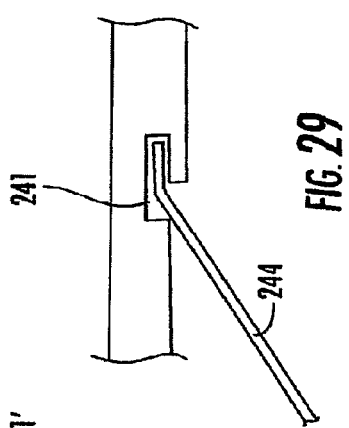

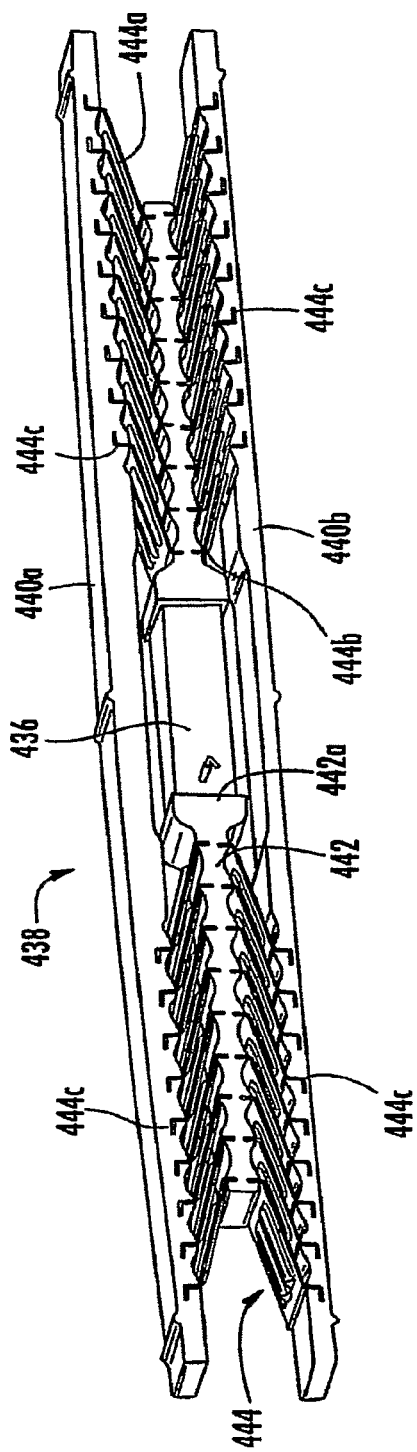
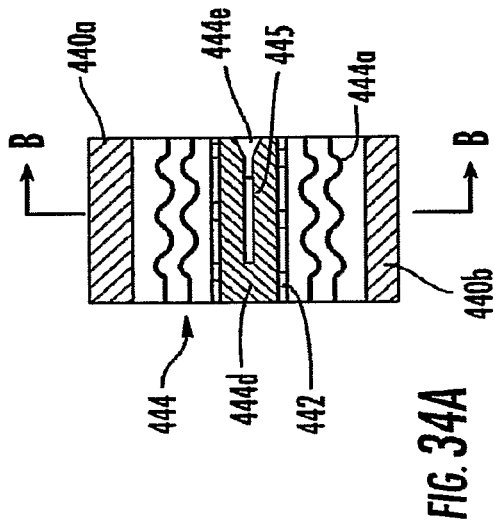
FIG. 33
FIG. 34A

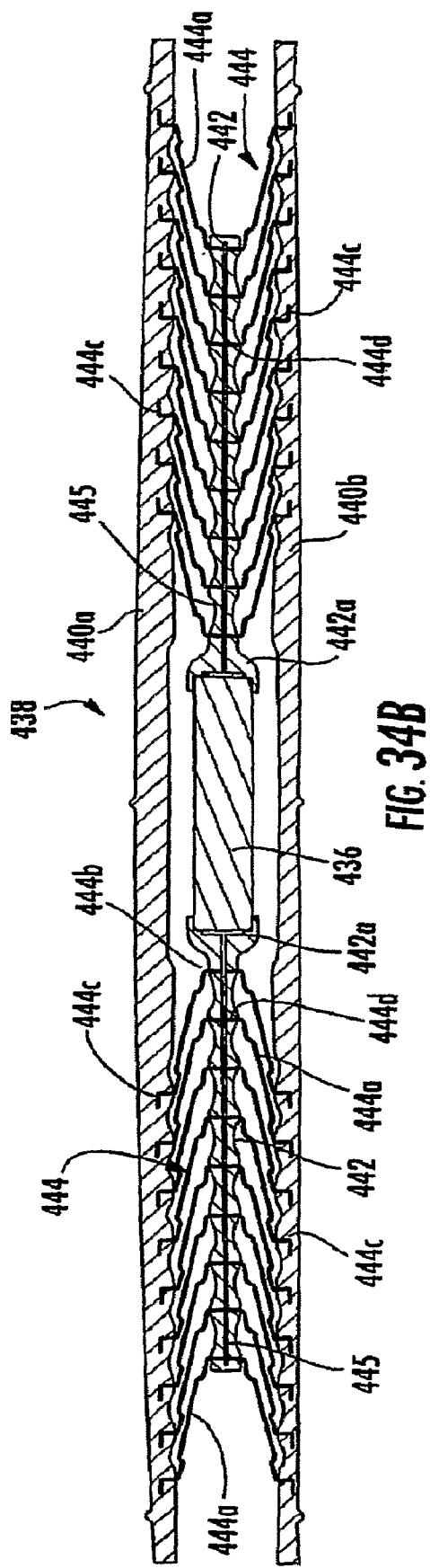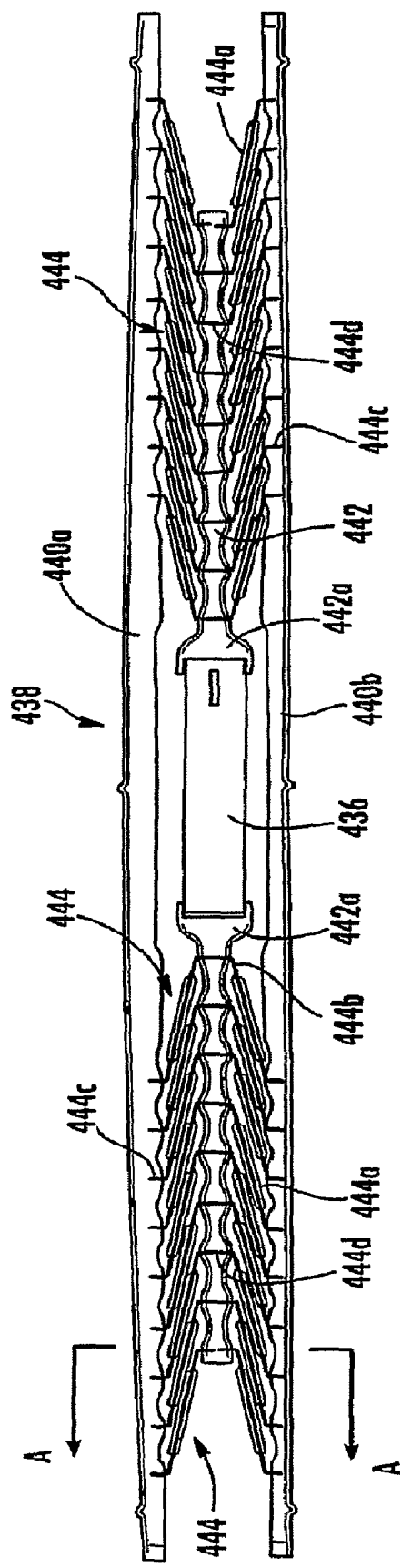
FIG. 34B
FIG. 34

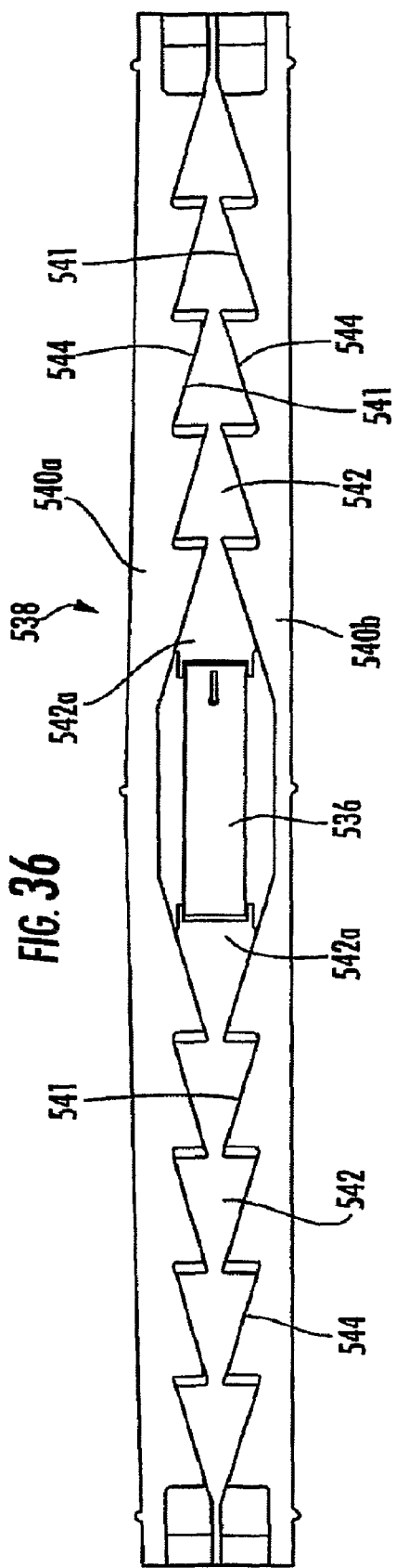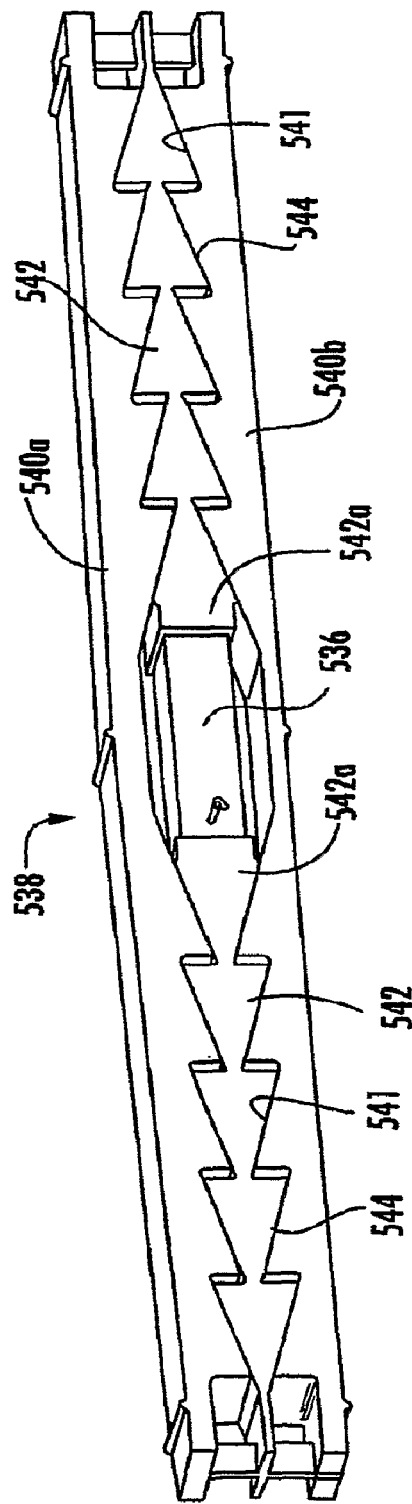

ACOUSTICAL WINDOW ASSEMBLY FOR VEHICLE

CROSS REFERENCE TO RELATED APPLICATION

The present application claims the benefit of U.S. provisional application Ser. No. 60/726,343, filed Oct. 13, 2005, which is hereby incorporated herein by reference in its entirety.

FIELD OF THE INVENTION

The present invention relates to a window assembly for a vehicle and, more particularly, a window assembly that includes a perimeter frame and a window panel and that is installed in a vehicle as a unit.

BACKGROUND OF THE INVENTION

It is known to provide a window assembly in a vehicle that includes a perimeter frame that is mounted or attached to a vehicle in a variety of ways, such as by adhesive or fasteners or the like. The window assembly is substantially sealed to the vehicle to limit leakage at the window.

Sound systems for vehicles have become increasingly complicated and sophisticated as vehicle owners desire enhanced sound quality in their vehicles. However, vehicle manufacturers often encounter packaging difficulties when attempting to fit large speakers, such as sub-woofers or the like, within the vehicle to provide the desired enhanced sound quality. It has been proposed to provide an audio speaker for a vehicle sound system by vibrating a panel of the vehicle, such as a window or trim panel or the like of the vehicle. Such audio devices have had the vibrating device or actuator disposed directly at the glass window or panel, and thus are highly dependant on the precise location of the actuator at the glass and on the resonant frequencies of the glass window or panel. Also, it has been heretofore challenging to provide a vibratable window panel that is sufficiently sealed around its perimeter to limit or preclude leaking around the window panel.

SUMMARY OF THE INVENTION

The present invention provides a window assembly that includes a window panel and an actuating device or actuating assembly operable to vibrate the window panel to produce sound for a vehicle sound system. The window assembly includes a frame that partially encompasses the perimeter of the window panel leaving a free or non-encompassed edge or perimeter region of the window panel (such as a bottom or lower edge or perimeter region of a rear window panel of a vehicle), whereby the actuating assembly is positioned at or near the free edge and functions to vibrate the window panel to produce the desired acoustical sound.

According to an aspect of the present invention, a window assembly includes a frame portion, a window panel and an actuating assembly. The frame portion partially surrounds the perimeter of the window panel and leaves a portion of the perimeter of the window panel free or partially or substantially free. The actuating assembly is positioned at or near the free perimeter portion of the window panel and is operable to vibrate the window panel. The window assembly includes a seal along the free perimeter portion to seal the window panel relative to the vehicle while allowing movement of the window panel in response to the actuating assembly.

The frame portion may fixedly secure to a fixed perimeter portion of the window (such as a perimeter edge region that is substantially opposite from the free perimeter portion), and may allow flexing along the other perimeter portions (such as the perimeter portions between the fixed perimeter portion and the free perimeter portion of the window panel). For example, a frame portion for a rear window assembly or backlite assembly or module may fixedly secure an upper perimeter portion at the vehicle, while allowing the side perimeter portions to flex as the lower or bottom free perimeter portion is vibrated or moved by the actuating assembly.

Preferably, the actuating assembly or actuator comprises a piezoelectrical actuator that functions to vibrate at or near the free perimeter portion of the window panel. The piezoelectrical actuator may function to excite an exciter device that converts the vibration of the actuator to the desired vibration or movement at the window panel (such as a movement toward and away from the window panel to impart the inward/outward movement or vibration of the window panel at the free perimeter portion of the window panel. The seal along the free perimeter portion of the window panel substantially seals the window panel at the vehicle during the movement or vibration of the window panel.

Therefore, the present invention provides an acoustic window assembly for a vehicle that vibrates the window panel while substantially sealing the window panel at the vehicle. The present invention thus provides an enhanced acoustical device for a vehicle sound system that utilizes a panel or window of a vehicle and thus does not interfere with the interior space of the vehicle cabin and/or other space at the cabin that may be utilized for other vehicle components or the like. Because the acoustic window assembly of the present invention may replace or supplement one or more speakers and/or subwoofers of the vehicle sound system, the acoustic window assembly may achieve substantial weight reduction over typical or conventional audio or sound systems for vehicles. The actuating assembly of the acoustic window assembly of the present invention includes an actuating device, such as a piezoelectric actuating device or the like, and an exciter or amplifying device, which engages the window panel and transfers the pulse of the actuating device along a region of the window panel to spread out the forces and movements/pulses at the window panel. The performance of the acoustic window assembly thus may not be so highly dependent on the precise location of the actuating assembly at the window panel as the acoustic devices of the prior art.

These and other objects, advantages, purposes and features of the present invention will become apparent upon review of the following specification in conjunction with the drawings.

BRIEF DESCRIPTION OF THE DRAWINGS

FIG. 8 is another perspective view of the lower or free perimeter portion of the acoustic window assembly, showing the actuating device engaging the curved window at the lower or free perimeter portion;

FIGS. 10-17 are sectional views of side frame portions suitable for use with the acoustic window assembly of the present invention;

FIG. 18 is a perspective view of a bracket assembly for limiting outward movement of a window panel, such as a windshield, suitable for use with the acoustic window assembly of the present invention;

FIG. 23 is a perspective view of another exciter useful with the present invention;

FIG. 24 is a side elevation of a portion of the exciter of FIG. 23;

FIG. 25 is a perspective view of the exciter of FIG. 23, with side plates attached thereto to retain the ribs or elements within the exciter;

FIG. 26 is an enlarged side elevation of an attachment portion of one of the ribs or elements with the upper plate of the exciter of FIG. 23;

FIGS. 27-29 are side elevations of exciters with optional rib attachments in accordance with the present invention;

FIG. 30 is a perspective view of another exciter with angled or bent ribs received within notches in the center rod or element of the exciter;

FIG. 33 is a perspective view of another exciter suitable for use with the actuating device and acoustic window assembly of the present invention;

FIG. 34 is a side elevation of the exciter of FIG. 33;

FIG. 34A is sectional view of the exciter taken along the line A-A in FIG. 34;

FIG. 34B is a sectional view of the exciter taken generally along the line B-B in FIG. 34A;

FIG. 35 is a perspective view of another exciter suitable for use with the actuating device and acoustic window assembly of the present invention; and FIG. 36 is a side elevation of the exciter of FIG. 35.

DESCRIPTION OF THE PREFERRED EMBODIMENTS

Figure 1:
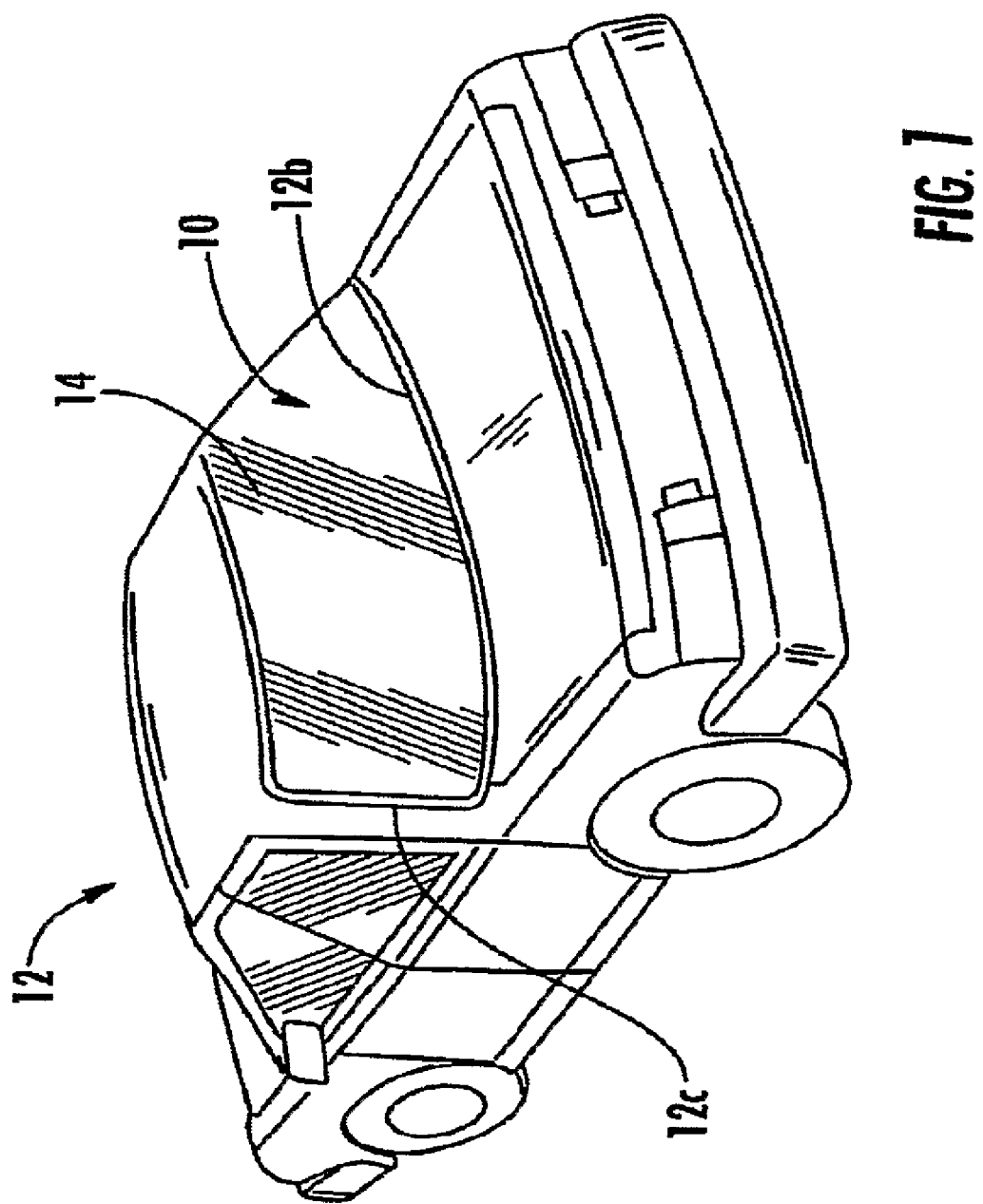
FIG. 1 is a perspective view of a vehicle with an acoustic window assembly in accordance with the present invention.
Figure 2:
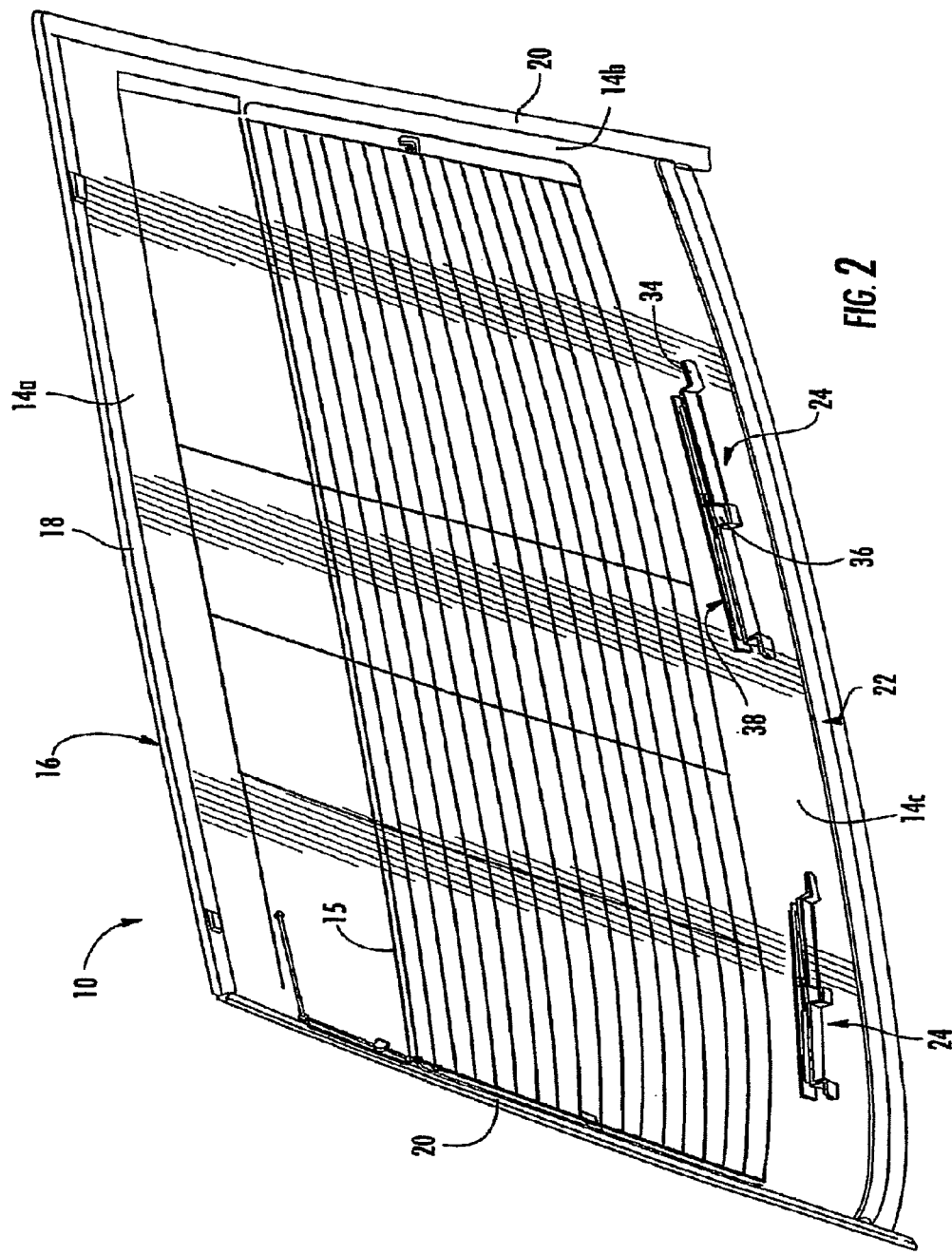
FIG. 2 is a perspective view of an acoustic window assembly of the present invention.
Figure 3:
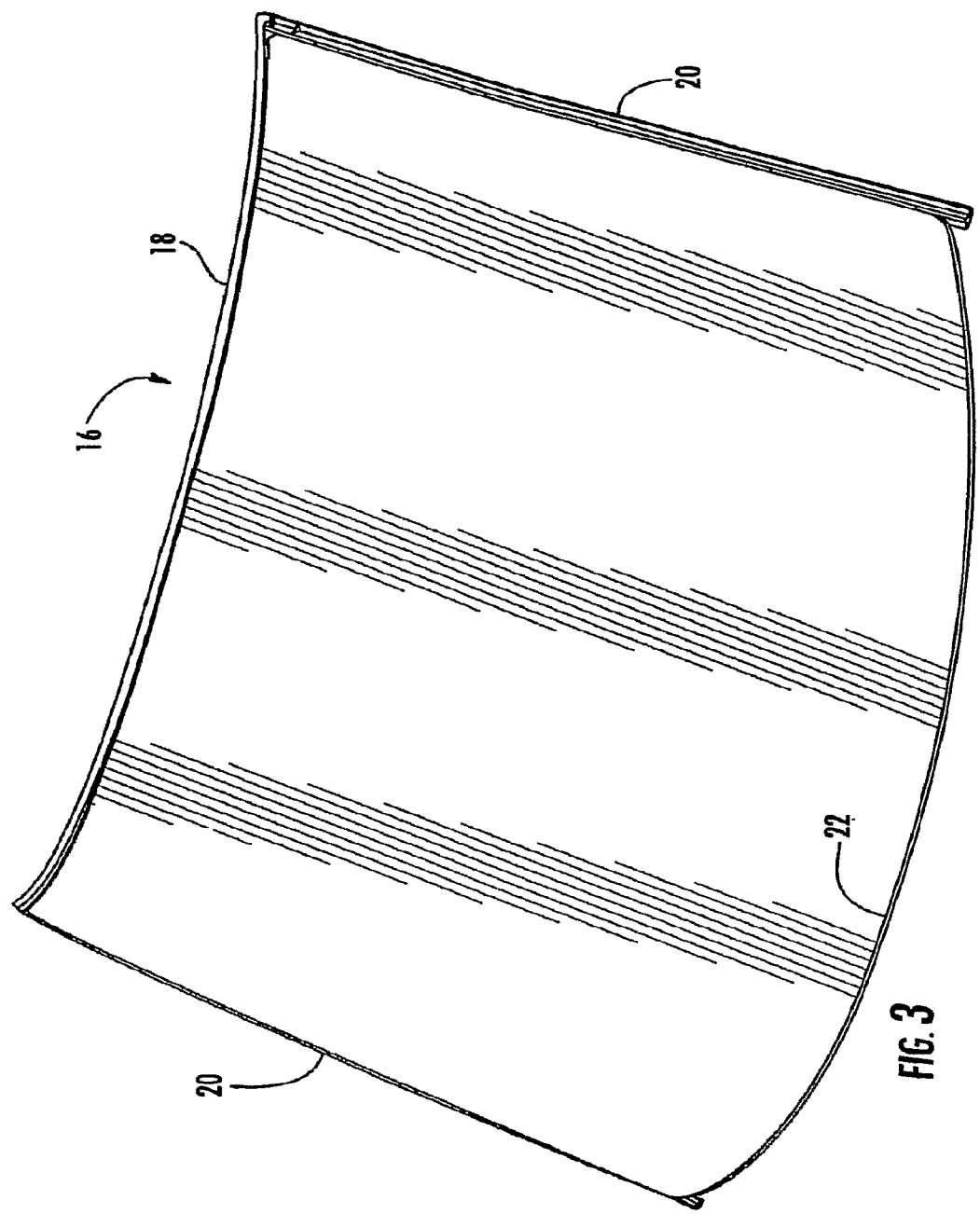
FIG. 3 is a perspective view of a frame and seal assembly for the acoustic window assembly of the present invention.
Figure 4:
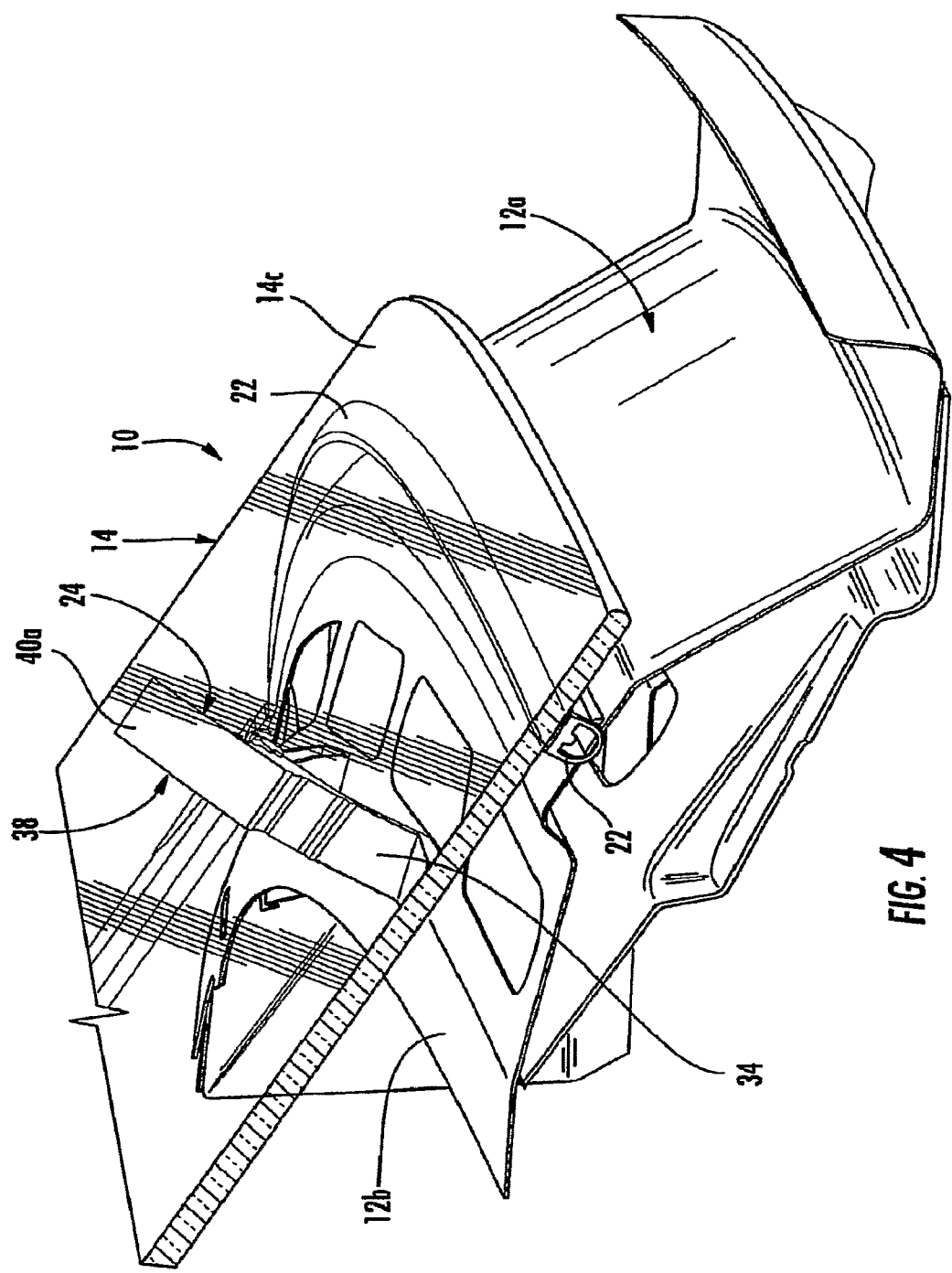
FIG. 4 is a perspective view of the lower or free perimeter portion of the acoustic window assembly of the present invention when the assembly is attached to a vehicle.
Figure 5:
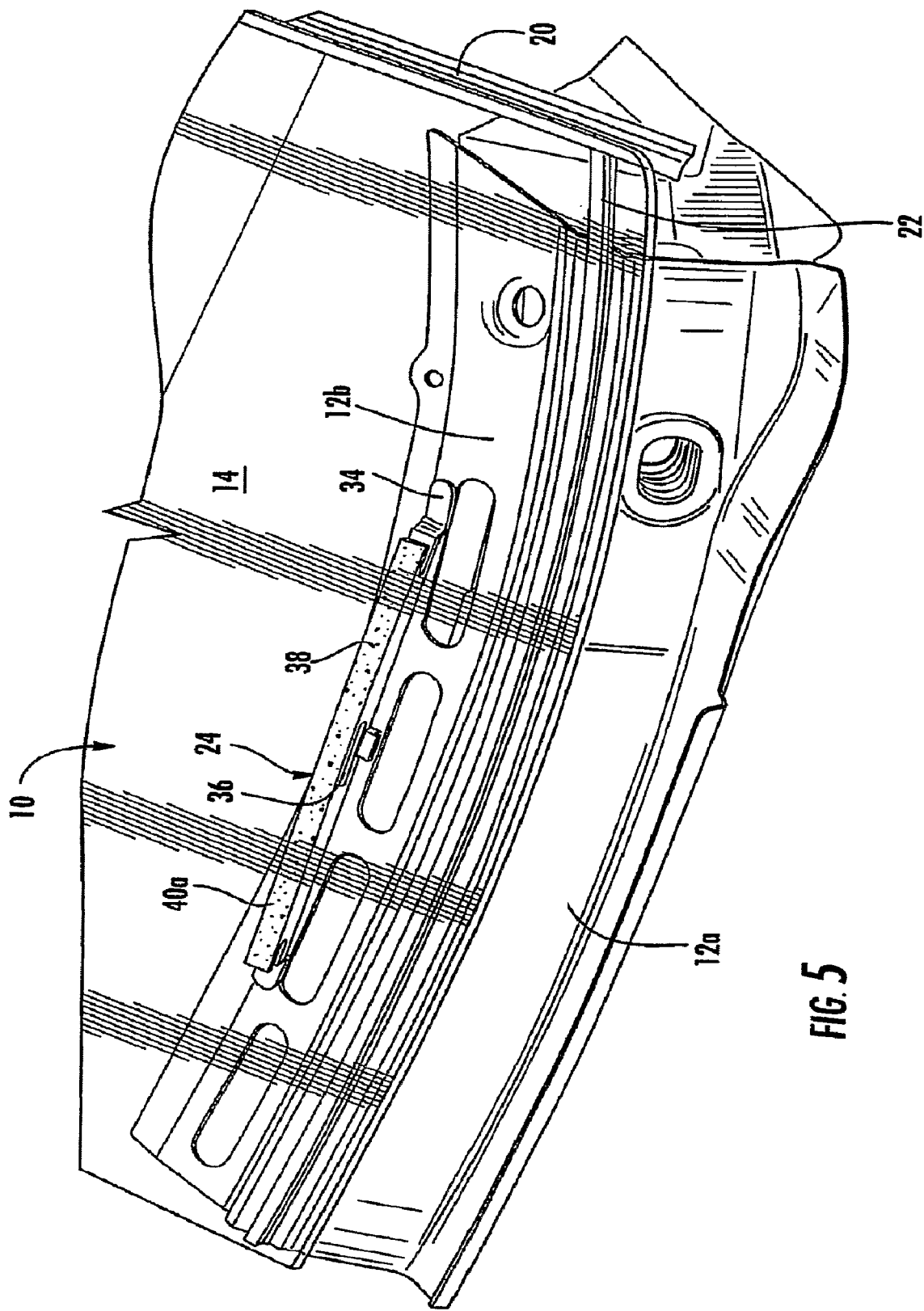
FIG. 5 is another perspective view of the lower or free perimeter portion of the acoustic window assembly of FIG. 4.
Figure 6:
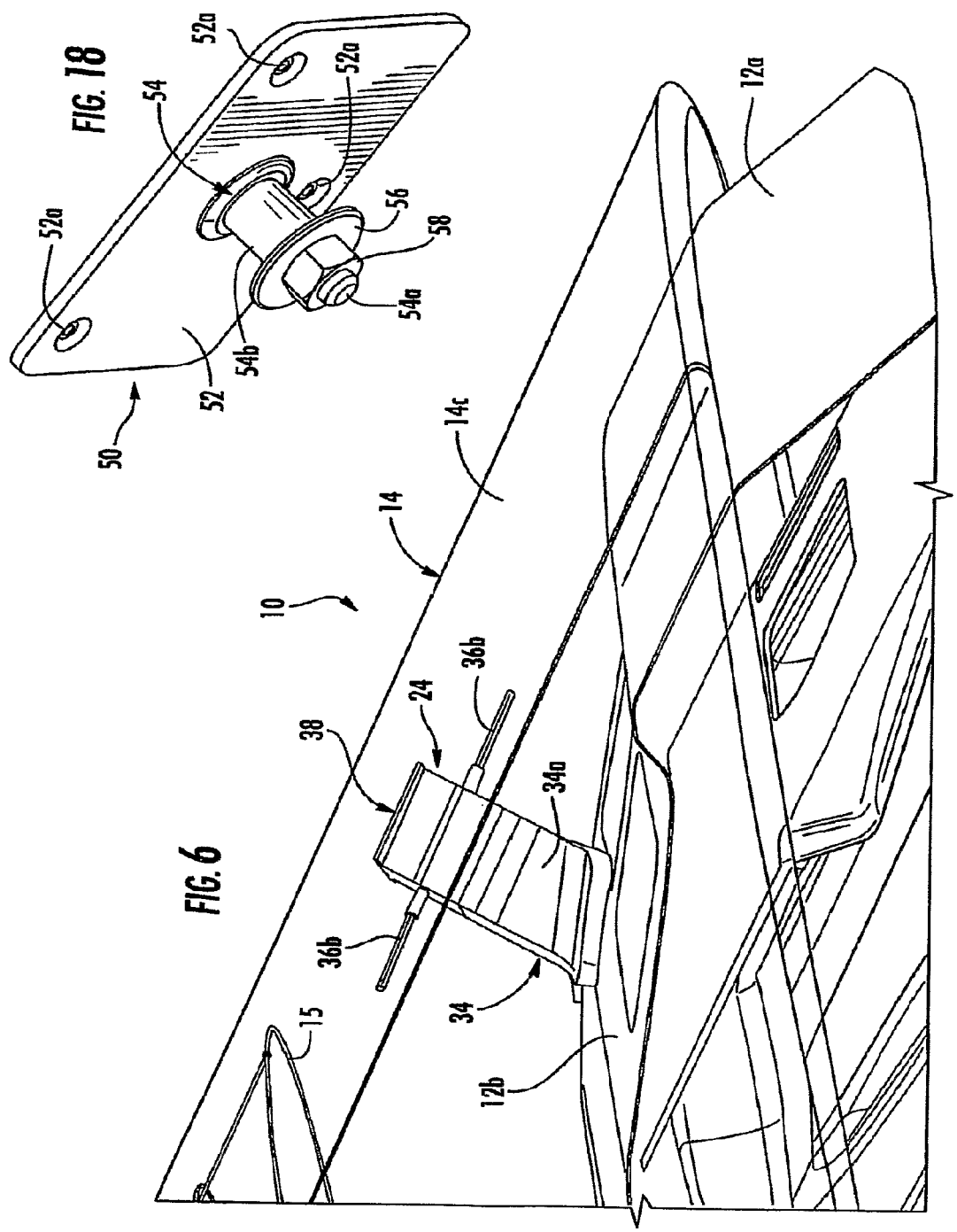
FIG. 6 is another perspective view of the lower or free perimeter portion of the acoustic window assembly of FIGS. 4 and 5.
Figure 7:
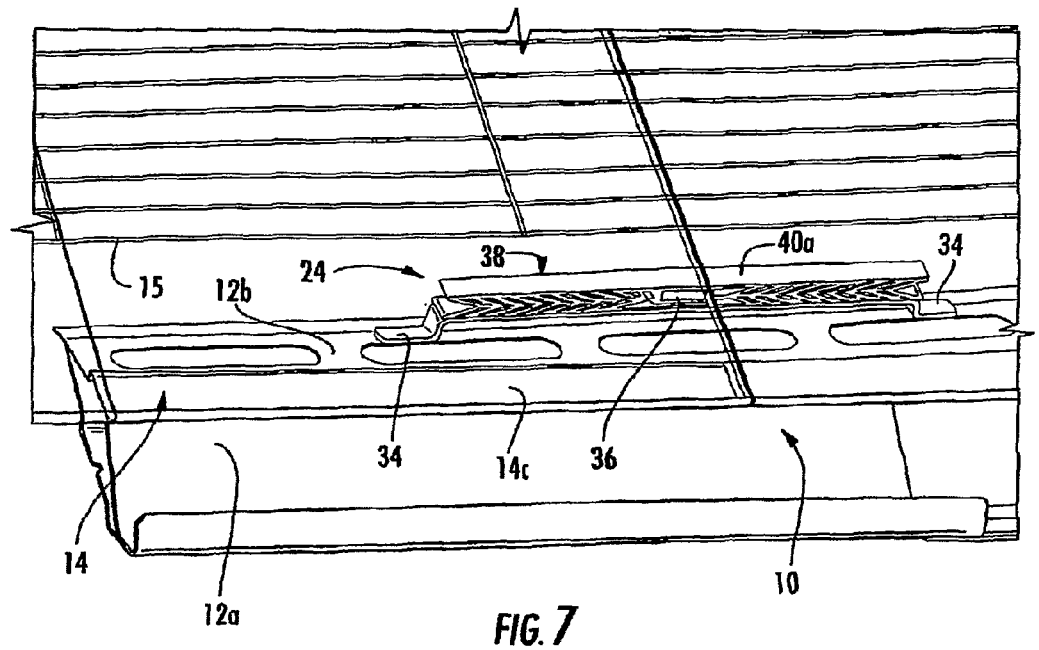
FIG. 7 is another perspective view of the lower or free perimeter portion of the acoustic window assembly of FIGS. 4-6.
Figure 9:
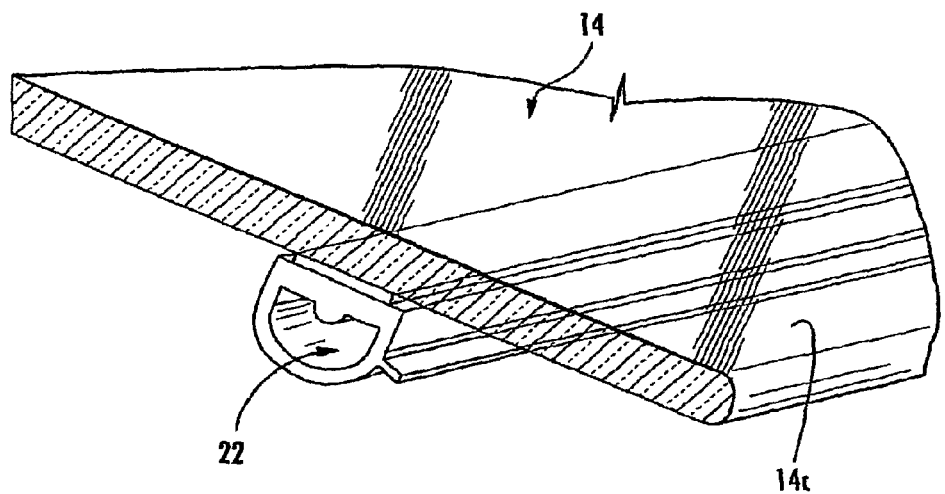
FIG. 9 is an enlarged perspective view of a lower seal useful with the acoustic window assembly of the present invention.
Figure 13:
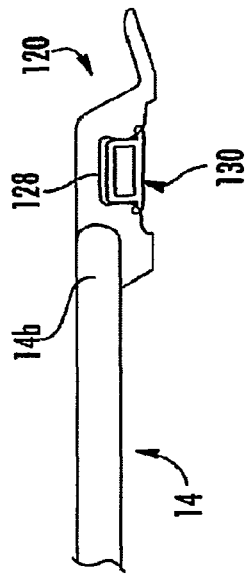
Figure 14:
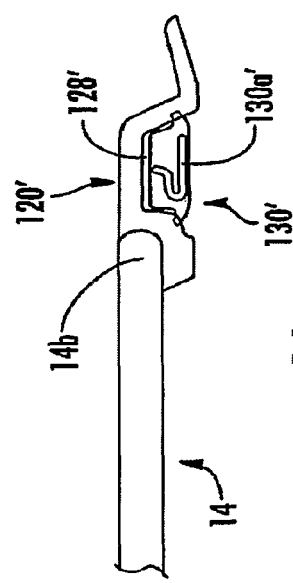
Figure 15:
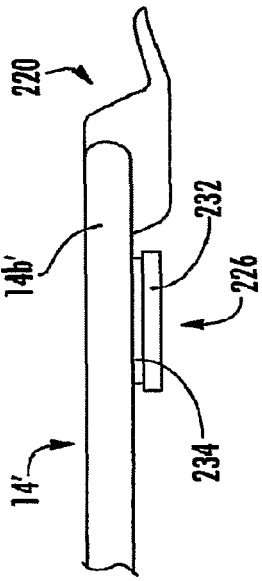

Referring now to the drawings and the illustrative embodiments depicted therein, an acoustic window assembly or module 10 is mounted to or attached to a vehicle 12 and is operable to vibrate or move a window panel 14 of the window assembly 10 to generate sound within the vehicle cabin (FIG. 1). As shown in FIG. 2, window assembly 10 includes a frame portion 16 that includes an upper frame portion or member 18 along an upper or fixed perimeter portion 14a of window panel 14 and a pair of side frame portions 20 extending downward from the upper frame portion 18 and along the side perimeter portions 14b of window panel 14. A seal or sealing member 22 is positioned along a lower or free perimeter portion 14c of window panel 14 to seal the lower perimeter portion 14c of window panel 14 against the vehicle while the window panel 14 is vibrated or moved by a vibrating or actuating device or actuating assembly 24, as discussed below. Window assembly 10 thus is attachable or mountable to a vehicle and sealed relative to the vehicle about its perimeter, while still allowing movement or vibration at one of the perimeter portions of the window in response to an output of the actuating assembly so as to vibrate the window panel at a desired frequency as may be dictated or driven by the vehicle sound or audio system.

In the illustrated embodiment, window assembly 10 is a rear window assembly or backlite assembly. Optionally, the window panel 14 may include heater elements 15 or the like disposed or established over at least a portion of the window panel for defogging or defrosting the window panel, as is known in the automotive window arts. One or more actuating assemblies 24 may be positioned generally at or near the bottom or lower perimeter portion 14c of window panel 14 to excite or vibrate the window panel at or near the free or substantially unrestricted or unrestrained perimeter portion of the window panel. For example, and as shown in FIG. 2, two actuating assemblies 24 may be spaced apart along a lower region of the window panel and may be cooperatively operable (such as in the manner discussed below) to vibrate or move the window panel to produce or generate the desired vibration and/or acoustical sounds. Optionally, the window panel may include a frit layer or darkened layer or area at the location of the actuating assemblies 24 so that the actuating assemblies are not readily viewable through the window panel by a person outside of the vehicle.

In the illustrated embodiment, window assembly includes a generally rectangular and curved window panel that is mounted to a vehicle frame or sheet metal at a rear portion of the vehicle. The window frame portion 16 encapsulates the perimeter portions of window panel 14 around three of the four sides or perimeter portions or edges of the generally rectangular window panel, while leaving the fourth perimeter portion or edge free or non-restricted. The window frame portion may substantially restrain or secure the upper perimeter edge portion of the window panel and may partially restrain the side perimeter edge portions of the window panel while leaving the lower perimeter edge portion of the window panel substantially free or unrestrained.

Although shown and described as having the upper perimeter portion of the window panel fixed and the lower perimeter portion of the window panel as the free perimeter portion, clearly, the frame portion may substantially fix other portions while leaving other portions substantially free or unrestricted, without affecting the scope of the present invention. Optionally, the free or substantially free or partially free perimeter portion of the window panel may be at any perimeter portion of the window, and may comprise two or more edge or perimeter portions of the window panel. For example, for a four sided or four edged (generally rectangular shaped) window panel, one perimeter edge of the window panel may be substantially free or substantially unrestrained, while a portion of the adjacent perimeter edges are partially free or unrestrained and partially restrained (such as via a frame portion that extends only partially along the side perimeter edge portions of the window panel), and while another perimeter edge of the window panel (opposite to the free perimeter edge) is substantially fixed or secured or restrained. Also, although shown and described as being a rear window or backlite of a vehicle, it is envisioned that the acoustic window assembly of the present invention is suited for applications at any window of the vehicle, such as a side window or side door window or sunroof or the like of the vehicle. The window panel may also be any shape, such as generally rectangular or generally triangular (whereby a portion of one or more perimeter edge portions may be substantially fixed, while a portion of one or more other perimeter edge portions may be free or partially free or substantially free or unrestrained), without affecting the scope of the present invention.

Frame portion 16 may comprise a polymeric or plastic frame portion, such as a PVC frame portion that provides an encapsulation of the upper and side perimeter portions of the window panel. Frame portion 16 may be formed utilizing aspects of the frame portions or encapsulated window modules of the types described in U.S. Pat. Nos. 6,669,267; 6,729,674; 6,572,176; 6,394,529; 6,299,235; 6,220,650, which are hereby incorporated herein by reference in their entireties. The upper frame portion 18 may receive the upper perimeter portion 14a of window panel 14 within a channel or track and may be substantially sealed relative to the upper perimeter portion 14a to limit leakage between the window panel and the upper frame portion. The upper perimeter portion 14a of window panel 14 thus is substantially fixedly secured relative to the vehicle frame, while the side frame portions 20 of window frame 16 partially retain or restrain the respective perimeter portions of the window panel along the vehicle frame. The upper portion of the window panel may be sealed or adhered or affixed to the frame portion via any suitable adhesive or bonding material, such as a urethane adhesive, such as, for example, a one component urethane adhesive or other suitable adhesive or bonding material, while remaining within the spirit and scope of the present invention. Similarly, the upper portion of the frame portion may be attached or affixed to the vehicle frame or sheet metal via any suitable adhesive or bonding material, while remaining within the spirit and scope of the present invention.

Side frame portions 20 receive and/or are bonded or adhered to and along or partially along the respective side perimeter portions 14b of window panel 14. Preferably, side frame portions 20 comprise a suitably flexible material and/or provide a flexible or sponge-like characteristic along the side perimeter portions 14b of window panel 14 so as to allow flexing of the window panel when the lower or free perimeter portion 14c is vibrated by the vibrating device. The window panel 14 is attached to or bonded or adhered to the frame portions along the respective perimeter portions (such as via any suitable adhesive or bonding material, such as, for example, a one component urethane adhesive), and the frame portions may be bonded or adhered or fastened or otherwise attached (such as via any suitable adhesive or bonding material and/or fasteners) to a metallic frame or sheet metal of the vehicle, so as to secure and seal the frame portions relative to the vehicle.

As shown in FIGS. 4-8, window assembly 10 is curved and is mounted at a rear portion of the vehicle with a curved lower perimeter portion 14a of window panel 14 located along a correspondingly curved vehicle frame portion 12a of vehicle 12. Seal 22 may be adhered along a lower portion of the window panel 14, such as about one inch or so above the lower perimeter edge of the window panel, and may engage or may be compressed against the vehicle frame portion 12a to substantially seal the lower perimeter window portion at the vehicle. In the illustrated embodiment, the seal or sealing element is an elongated bulbous seal, but may be any other type of sealing member or element, such as a Y-shaped seal or the like, to substantially seal the lower window portion relative to the vehicle frame portion, without affecting the scope of the present invention. Preferably, the seal may be compressible and flexible (such as a compressible resilient rubber or elastomeric material) to allow for compression/flexing of the seal while the lower window portion is moved or vibrated while maintaining the seal between the window panel and the vehicle frame portion.

Thus, while the lower perimeter portion 14c of window panel 14 is thus substantially freely movable inward and outward, the side perimeter portions 14b of window panel 14 are partially retained by the side frame portions 20 of window frame portion 16. Preferably, the material and configuration of the side frame portions 20 are selected to provide the desired degree of flexibility along the side perimeter portions of the window panel so as to allow vibration and slight movement of the window panel without leakage occurring between the window panel and window side frame portions and between the window frame portion and the vehicle frame portion. The frame portions are configured to allow the appropriate amount of flexing or movement along the frame portions such that the range of allowed movement or stroke of the window panel is within the range of the movement or stroke of the actuating assembly so as to limit or substantially preclude the window panel from moving too much and contacting or fouling against the vehicle frame or the like.

As shown in FIGS. 10-17, various types of side frame portions may be implemented that provide the desired degree of flexibility along the side perimeter portions of the window panel, without affecting the scope of the present invention. The side frame portions thus allow for movement or vibration of the window panel in an inward and outward direction but substantially retain the window panel in place and seal the window panel relative to the vehicle frame. The side frame portions are adhered or bonded or otherwise attached to the vehicle frame portion or sheet metal along an attaching surface 26 (which may be defined as a recess or channel along the side frame portion for receiving a bead of adhesive or the like therealong for adhering or bonding the window frame portion to the vehicle sheet metal) of the side frame portions (while the upper or fixed frame portion is similarly attached to the vehicle frame portion or sheet metal at the upper or fixed perimeter portion of the window panel).

Figure 10:
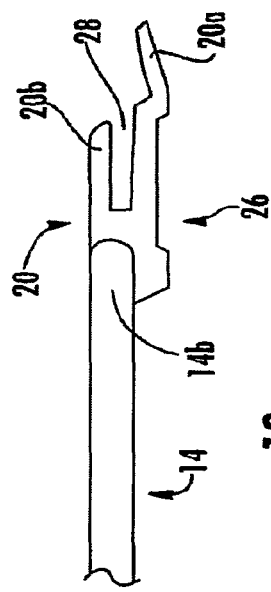

For example, and with reference to FIG. 10, a side frame portion 20 may include a slot or cavity 28 formed along an outside (the side facing away from the window panel and toward a sideward direction with respect to the direction of travel of the vehicle) of the side frame portion 20 to facilitate flexing of the side frame portions as the window panel is vibrated/moved via the actuator or actuating assembly 24, as discussed below. The side frame portion 20 thus may mount to the sheet metal of the vehicle at mounting region 26 and includes an outer flange 20a for engaging a portion of the sheet metal of the vehicle and an outer lip or portion 20b that is viewable around the perimeter of the window panel and that generally conceals the cavity 28. The sheet metal for all of the side frame portion forms described herein may be formed to define a recess or pocket in which the window panel and frame portion are received, with the mounting portions of the side frame portions and upper or fixed frame portions being adhered to or bonded to or otherwise attached or secured to the sheet metal of the vehicle to attach the window assembly to the vehicle.

Figure 11:
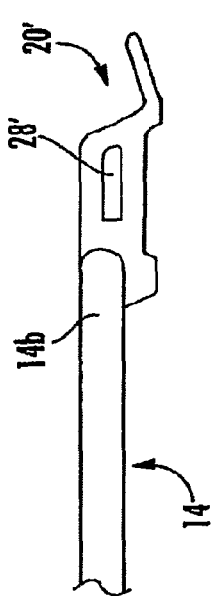
Figure 12:
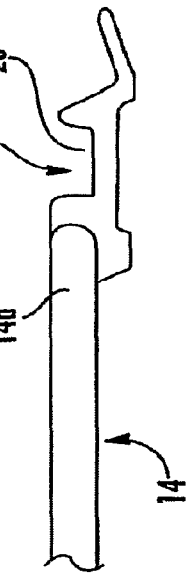

Optionally, and with reference to FIGS. 11 and 12, a side frame portion 20' may include a cavity 28' formed along the side frame portion 20', or a side frame portion 20" may have a notch or narrowed region 28" formed along the side frame portion 20" to allow for the desired degree of flexibility of the side frame portions at the side portions of the window panel. Optionally, and with reference to FIGS. 13 and 14, a side frame portion 120, 120' may include a cavity or slot or channel 128, 128' formed along the side frame portion 120, 120', respectively, and a soft or flexible or sponge-like element or bulb 130, 130' may be located along and at least partially within the channel 128, 128' to provide the desired degree of flexibility and/or sponge-like quality along the side frame portions 120, 120'. Optionally, the flexible element 130 (FIG. 13) may comprise a hollow or bulbous strip or bulb seal, such as an EPDM strip or Santoprene strip or molding or PVC strip or molding or the like, or the flexible element 130' (FIG. 14) may be a solid strip (such as a strip formed of EPDM or Santoprene or PVC or the like), and may include a stiffening or reinforcing element or strip 130a' within and/or along the flexible element (such as insert molded within the flexible element or strip). Optionally, and with reference to FIG. 15, the side frame portion 220 may comprise a substantially solid frame member or portion, and a separate attaching or barrier strip 232 may be adhered or bonded or otherwise attached to the interior surface of the window panel 14' and inward of the side frame portion (which does not include a wider perimeter or side sealing portion as shown in FIGS. 10-14, whereby the outer side perimeter edge portion 14b' of window panel 14' may extend further outward than the side perimeter edge portion 14b of window panel 14 of the embodiments described above), whereby the strip 232 provides the mounting portion 226 of the window assembly and is adhered or bonded or otherwise secured to the vehicle frame portion or sheet metal. The strip 232 thus may be sufficiently soft and/or flexible to allow the desired degree of vibration and/or movement of the side perimeter portions of the window panel relative to the vehicle sheet metal. The strip 232 may comprise any suitable material, such as a PVC or EPDM material or the like, and may be adhered to the window panel via a tape strip 234 or the like, such as via a double-sided acrylic foam tape or the like. Optionally, and as shown in FIG. 16, the side frame portion 220' may extend over the interior surface of the window panel 14' and provide a mounting area 226' at an inward location of the window panel. The side frame portion 220' thus may provide the desired softness or flexibility at the attachment or mounting area 226' to allow flexing or movement of the window panel along the side perimeter edge portions of the window panel relative to the vehicle sheet metal.

Optionally, and with reference to FIG. 17, the side frame portion 220" may extend over the interior surface of the window panel 14' and provide a mounting area or surface 226" at an inward location of the window panel. The side frame portion 220" is adhered to the interior surface of the window panel 14' via an adhesive, such as a two-sided tape 234" or other suitable adhesive. In the illustrated embodiment, side frame portion 220" includes a metallic carrier or element or stiffening element 220a" along the frame portion and an air cavity 220b" also along the frame portion. The side frame portion 220" thus may be formed of a substantially rigid plastic material, yet still allows for flexing of the carrier when the window panel is being pulsed or vibrated, and the air cavity 220b" may cushion the vibration of the window panel relative to the vehicle frame. The side frame portion 220" thus may provide the desired softness or flexibility at the attachment or mounting area 226" to allow flexing or movement of the window panel along the side perimeter edge portions of the window panel relative to the vehicle sheet metal. The side frame portion 220" thus may be adhered to the vehicle sheet metal or frame portion 12c (such as the metal or frame portion of the vehicle along the sides of the window panel) via any suitable adhesive 226a" along mounting area 226" (which may include a channel or recess therealong to receive the adhesive and provide the desired spacing or gap for the adhesive between the recessed surface of the mounting area and the vehicle frame portion 12c). As can be seen in FIG. 17, the side frame portion 220" and vehicle frame portion 12c may be configured so that the window panel is generally flush mounted within a recessed portion of the vehicle frame portion, with the outer surface of the window panel being generally at or near the outer surface of the vehicle sheet metal or frame portion.

Other forms of side frame portions and strips and the like may be implemented to allow for flexing or vibrating of the window panel along or partially along or substantially along the side perimeter portions of the window panel during operation of the vibrating device or actuating assembly 24, while substantially sealing the window panel and window frame portion to the vehicle, without affecting the scope of the present invention. The materials for the side frame portions and/or the attachment strips and/or the inserts or elements along the side frame portions or along the window panel may be selected to provide a desired degree of resiliency or flexibility or softness along or partially or substantially along the side perimeter portions of the window panel to allow the window panel to vibrate in the desired manner. Optionally, other fasteners or posts or structures or the like may be provided at or attached to or adhered or taped to the side frame portions to limit or substantially preclude lateral movement of the window panel, while allowing flexibility and slight movement of the window panel in the inward and outward directions.

Optionally, the actuating assembly may be adapted or configured for application to the vehicle backlite or other window of the vehicle, such as, for example, a side window or side fixed window of the vehicle or a sunroof of the vehicle or a windshield of the vehicle. It is envisioned that for applications at the vehicle windshield, it is preferred to limit outward movement of the windshield to meet impact requirements for vehicles. Thus, an impact limiting element or outward movement element may be implemented at the windshield (such as at the lower portion or lower corners of the windshield) to allow for movement or pulsing or vibrating of the windshield while limiting outward movement of the windshield when the windshield is impacted by an object moving forwardly with respect to the vehicle. Such an impact limiting element may be attached to either the windshield or the vehicle frame or sheet metal and movably attached to the other of the windshield or vehicle frame or sheet metal so as to allow for relative movement between the windshield and vehicle frame while limiting outward movement of the windshield relative to the vehicle frame.

For example, and as shown in FIG. 18, an impact limiting element or bracket assembly 50 may be attached to the vehicle windshield and movably attached to the vehicle sheet metal or frame. The bracket assembly 50 includes a mounting plate 52 for attaching to the interior surface of the vehicle windshield, such as via a suitable adhesive or bonding material. As shown in FIG. 18, mounting plate 52 may include a plurality of dimples or projections 52a protruding from its attaching surface for engaging the interior surface of the windshield and establishing the desired or appropriate gap between the attaching surface and the interior surface of the windshield for the selected adhesive or bonding material being used to attach the bracket to the windshield (such as by utilizing aspects of the window assemblies described in U.S. Pat. Nos. 6,871,450; 6,298,606; 6,128,860; 5,966,874; 5,704,173; 5,551,197, and U.S. patent application Ser. No. 11/436,774, filed May 8, 2006, now U.S. Pat. No. 7,360,338; and/or Ser. No. 11/037,029, filed Jan. 18, 2005 and published Jun. 9, 2005 as U.S. Publication No. US-2005-0121.942, which are hereby incorporated herein by reference in their entireties). Bracket assembly 50 includes a shaft or stud 54 extending from mounting plate 52 and having a threaded end 54*a*, where a washer or other engaging element 56 and a nut or female fastener 58 are attached to limit outward movement of the mounting plate 52 (and thus the windshield) relative to the vehicle frame or sheet metal, as discussed below.

Optionally, and desirably, the threads may be established only partially along the shaft so that the nut may be fastened or tightened to the end of the shaft leaving a non-threaded portion 54*b* of shaft 54 between the washer 56 and mounting plate 52. Optionally, the threaded portion may have a smaller diameter than the non-threaded portion of the shaft, such that the washer may rest against a step or annular surface at the end of the non-threaded portion and the nut may substantially clamp or secure the washer at the step via tightening of the nut along the threaded portion.

Thus, the mounting plate 52 is adhered or bonded or otherwise substantially fixedly attached to the windshield (such as to the interior surface of the windshield and generally at or along the lower portion of the windshield). The shaft 54 extends from the mounting plate 52 and through an aperture or hole in the vehicle frame or sheet metal. The washer 56 and nut 58 are positioned at the threaded end 54*a* of shaft 54 at the other side of the vehicle frame or sheet metal, and the nut is secured at the end of the shaft. The window thus may pulse or move or vibrate relative to the vehicle frame via movement of the shaft through the hole in the vehicle frame. If the windshield is pushed outward or forwardly relative to the vehicle and vehicle frame, the washer engages the vehicle frame and limits further outward/forward movement of the windshield. Although shown and described as a threaded shaft and a washer and female fastener, other means for limiting outward movement of the windshield or window panel relative to the vehicle sheet metal or frame may be implemented (such as other fasteners or clips that engage the opposite surface of the sheet metal from the window when the window is pushed outwardly yet allow for relative movement between the window and sheet metal) while remaining within the scope of the present invention. Thus, the bracket assembly (or multiple such bracket assemblies located at or along the lower region of the windshield) allows for vibration or pulsing of the windshield via an actuating device while limits outward movement or popping out of the windshield during an impact at the windshield, such as may occur during sudden stopping of the vehicle.

The frame portion of the window assembly of the present invention thus allow for the window panel to move in a hinging motion with the upper portion or roofline portion of the window panel (or other perimeter portion depending on the particular application of the window panel assembly) being in a generally fixed state, and with the lower portion of the window panel (or other perimeter portion depending on the particular application of the window panel assembly) moving in or out (preferably only two degrees of freedom). The side frame portions or pillars (or other perimeter portion or portions depending on the particular application of the window panel assembly) may flex as the actuating assembly articulates in a motion generally normal to the glass or window panel surface (at the lower region of the window panel where the actuating assembly is located), so as to allow the window panel to move and vibrate in the desired or appropriate manner in response to actuation of the actuating assembly.

Figure 19B:
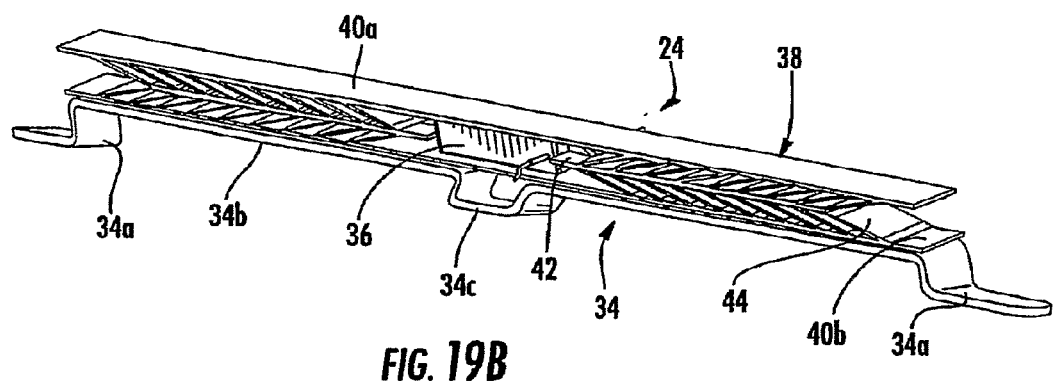
FIG. 19B is a perspective view of the actuating device and exciter of FIG. 18A.
Figure 19A:
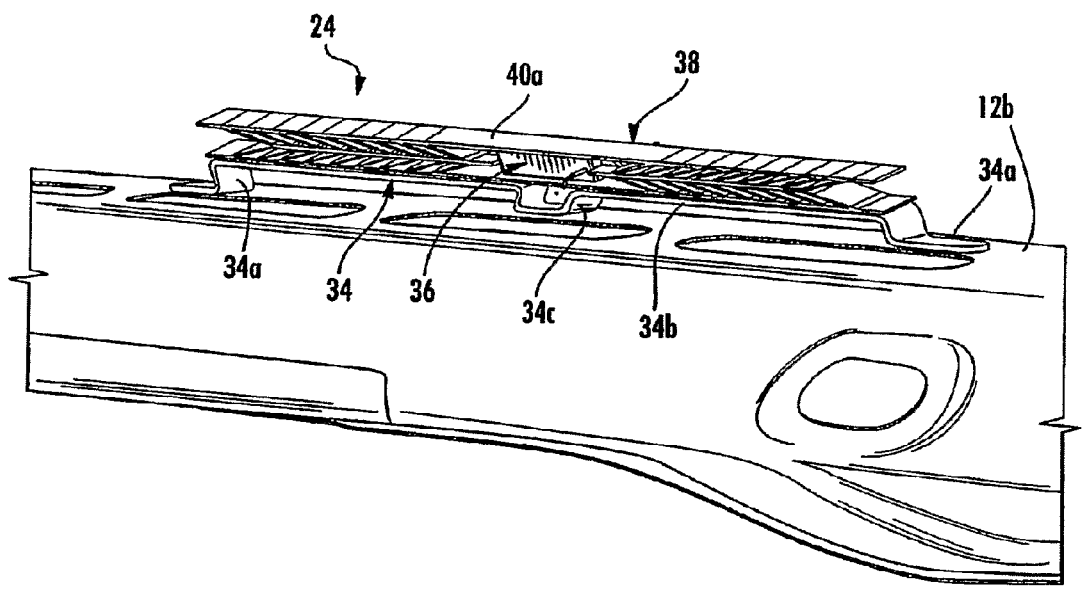
FIG. 19A is a perspective view of an actuating device and exciter suitable for use with the acoustic window assembly of the present invention, as mounted to a vehicle frame portion.

The actuating assembly 24 is preferably located at the lower region of the rear window panel 14, and is thus positioned at a parcel shelf or the like of the vehicle, where the actuating assembly is not readily viewable and does not substantially interfere with a driver's rearward field of view through the vehicle. As best shown in FIGS. 4-7 and 19A, actuating assembly 24 may be mounted to the vehicle frame portion 12*a* via a mounting bracket 34. For example, actuating assembly 24 may be bonded or otherwise secured to a support portion or web or member 34*b* of mounting bracket 34, whereby the mounting bracket is in turn secured to the vehicle sheet metal or structure, such as via adhesive or bonding or fastening of flanges or feet or pads or legs 34*a* of mounting bracket 34 to the vehicle structure or sheet metal. In the illustrated embodiment, the mounting bracket 34 mounts to a generally horizontal portion 12*b* (such as at a parcel shelf at the rear of the vehicle and at or near where the lower portion of the window panel meets or approaches the vehicle frame) of the vehicle frame portion and is configured or angled so as to angle the actuating assembly to be generally parallel to or generally along the inner surface of the window panel 14. As shown in FIGS. 19A and 19B, mounting bracket 34 includes a pair of legs 34*a* (such as at opposite ends of the mounting bracket) that support and space a support portion 34*b* of bracket 34 at the vehicle frame portion 12*b*. Legs 34*a* of bracket 34 are curved or bent or angled to provide the desired orientation of the support portion 34*b* relative to the vehicle frame portion 12*b*. Optionally, bracket 34 may include a middle leg or support 34*c* at or near a central region of the bracket 34 to provide additional support of the actuating assembly 24 at the vehicle frame portion 12*b* (whereby the middle leg 34*c* may also be bonded or adhered or otherwise attached to the vehicle structure or sheet metal). The mounting bracket 34 thus functions to bridge the gap between the window panel and the parcel shelf or frame portion of the vehicle and to orient the actuating assembly at the desired or appropriate angle along the window panel. The mounting bracket may be attached to the sheet metal or frame portion or structure of the vehicle and an interior trim panel may partially or substantially encase or conceal the actuating assembly at the lower region of the rear window panel at the parcel shelf of the vehicle, so that the actuating assembly is not readily viewable by a person inside or outside of the vehicle cabin.

Although shown and described as being attached to a bracket which is in turn attached to the vehicle structure to space the actuating assembly from the vehicle structure, it is envisioned that the actuating assembly may be attached directly to the vehicle structure or sheet metal without any spacing bracket. Preferably, the vehicle structure or sheet metal may include or provide a mounting area for the actuating assembly, such as a raised platform or substantially planar platform or the like, whereby the actuating assembly may be adhered or bonded or otherwise secured directly to the vehicle structure. For example, a lower plate 40*b* of an exciter 38 (discussed below) may be bonded or adhered or otherwise attached/secured (such as via fasteners or the like through end extensions at opposite ends of the lower plate 40*b*) to the vehicle structure, whereby the upper plate 40*a* is bonded or adhered or attached to the interior surface of the window panel, as discussed below. Optionally, the vehicle structure or sheet metal may be formed with a recess or sill or depression for receiving or partially receiving the actuating assembly, without affecting the scope of the present invention. The actuating assembly may be formed to correspond to the sheet metal form and may be adhered or bonded or otherwise attached directly to the sheet metal or vehicle structure (such as via the lower plate of the actuator being bonded or attached to the vehicle structure or sheet metal), or the actuating bracket may be attached via a bracket as described above or via a solid mounting bracket or block or any other suitable attachment means for attaching the actuating bracket to the vehicle.

Thus, the upper plate of the exciter or actuating assembly thus may be attached to or affixed to or bonded to the interior surface of the window panel while the lower plate (or mounting bracket) is attached or affixed or bonded to the vehicle frame or sheet metal. For example, the upper plate of the exciter or actuating assembly may be bonded or adhered to the interior surface of the window panel via a suitable adhesive, such as, for example, a two component mixed urethane or other suitable adhesive or bonding material, while remaining within the spirit and scope of the present invention. Also, for example, the lower plate of the exciter or actuating assembly (or the mounting bracket of the exciter or actuating assembly) may be adhered or bonded or affixed to the vehicle sheet metal via any suitable adhesive or bonding material, such as a two component mixed urethane or other suitable material, while remaining within the spirit and scope of the present invention.

The actuating assembly 24 is operable to vibrate in a manner that imparts a movement that is substantially limited to motions that are generally normal to or transverse to the window panel at the location of the actuating assembly, such that the window panel is moved only inward and outward at the lower window panel portion by the actuating assembly. Movement of the lower perimeter portion of the window panel in this manner causes the window panel to move about or relative to the fixed upper perimeter portion in a hinge like motion about the fixed upper perimeter portion of the window panel.

In the illustrated embodiment, actuating assembly 24 comprises a piezoelectric actuating device or element 36 that is operable to move or actuate or excite a mechanical exciter device or element 38 that engages the interior surface of the window panel so as to impart the movement at the window panel. As shown in FIGS. 7, 19A, 19B and 21, exciter device 38 receives piezoelectric actuating device 36 therein, whereby a pulse or vibration or motion imparted by piezoelectric actuating device 36 is received by exciter device, which in turn imparts a pulse or vibration or motion against the window panel 14.

Figure 20A:
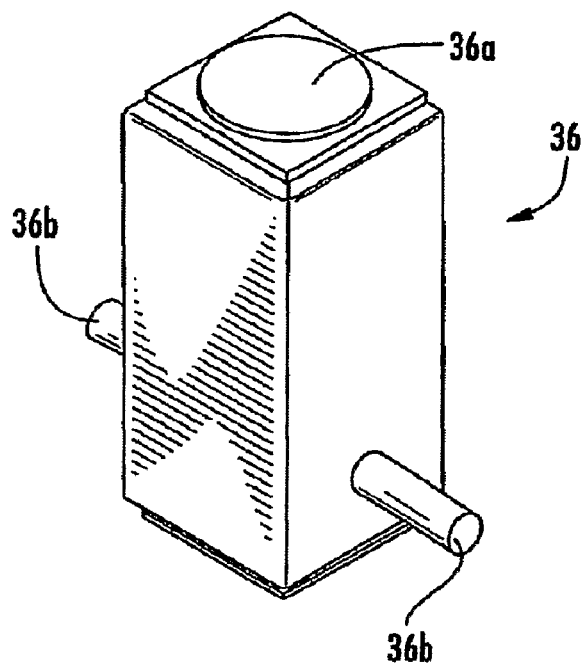
FIGS. 20A and 20B are perspective views of a piezoelectric actuating device suitable for use with the acoustic window assembly of the present invention.
Figure 20B:
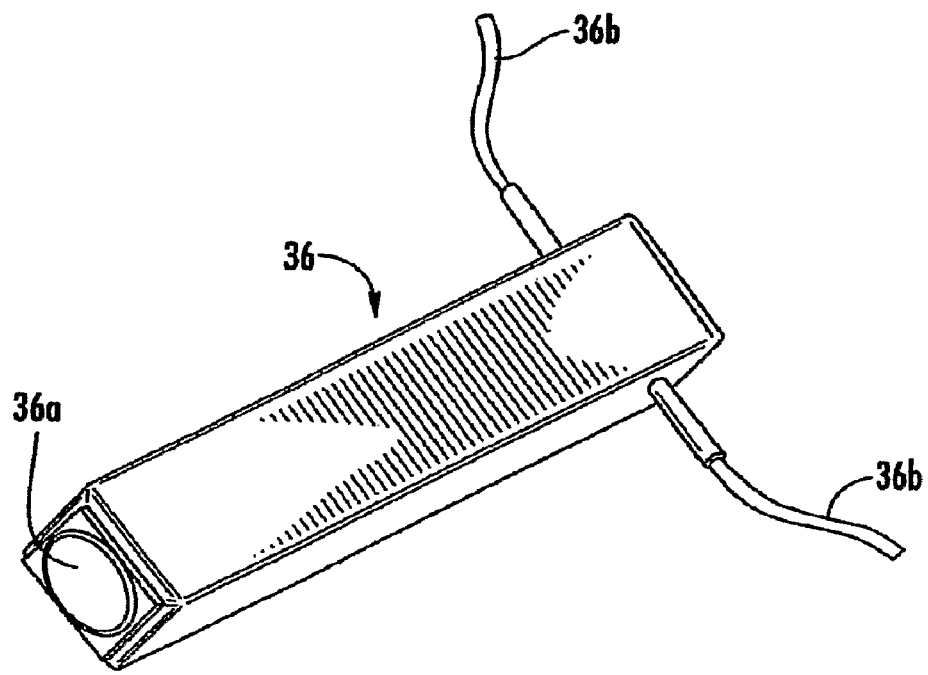
Figure 21:
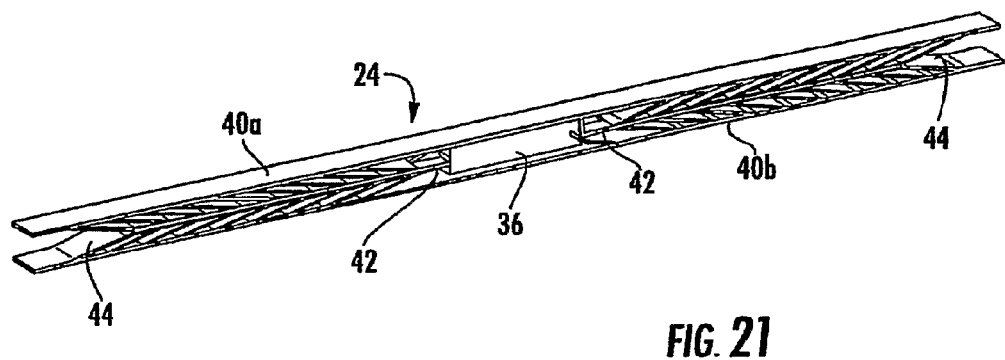
FIG. 21 is a perspective view of the exciter of FIGS. 19A and 19B.

Piezoelectric actuating device 36 (FIGS. 20A and 20B) may be any type of piezoelectric device, and may utilize aspects of the devices described in U.S. Pat. Nos. 6,904,154; 6,865,277; 6,839,444; and 6,522,755, which are hereby incorporated herein by reference in their entireties. The piezoelectric actuating device may include a plurality of plates or discs that function to generate a pulse or stroke of an end plate or end face 36a of the device. In the illustrated embodiment, piezoelectric actuating device 36 comprises an elongated piezoelectrical stack and is operable to generate a pulse or stroke at each of its end faces 36a of approximately 40 to 75 microns when actuated. The piezoelectric actuating device may exert a force of approximately 2000 Newtons or about 1500 to 2500 Newtons at the end faces when actuated. The piezoelectric actuating device pulses the end face, which imparts a force and movement at the exciter, while the actuating device provides a substantially equal and opposite force and movement at the opposite end or end face of the actuating device so that the forces and movements are pulsed at both ends of the piezoelectric actuating device. The end faces thus may move or pulse outwardly and inwardly together, such that an outward pulse or movement of one of the end faces occurs at substantially the same time as a similar outward pulse or movement of the other end face.

The piezoelectric actuating device is connected to a power source (such as via electrical leads or wires or terminals or connectors 36b) and is actuated and controlled to pulse or vibrate at a desired or appropriate amplitude and frequency. Such piezoelectric devices typically are high voltage (such as up to about 200 volts), low current devices. Thus, the piezoelectric actuating device is preferably connected to a voltage step up converter or amplifier, which may step up or convert the input voltage (such as 12 volts from the vehicle power source or battery) to a higher output voltage (such as about 200 volts or more or less depending on the desired or appropriate voltage for operation of the piezoelectric device), while stepping down or reducing the current. The amplifier thus may be connected to the vehicle power source and may provide a high voltage, low current power source for the piezoelectric actuating device, whereby the piezoelectric actuating device vibrates or pulses at the desired amplitude and frequency to actuate the exciter 38.

The exciter 38 is an elongated element or member that receives piezoelectric actuating device 36 at a generally central region of the exciter (however, the piezoelectric actuating device may be positioned elsewhere along the exciter, and/or may include two piezoelectric actuating devices, with one at each end or end region of the exciter, without affecting the scope of the present invention). Exciter 38 comprises an elongated upper side member or upper plate 40a and an elongated lower side member or lower plate 40b and a pair of generally central members or rods or ribs or plates 42 that extend between the plates 40a, 40b and that engage the respective end faces 36a of the piezoelectric actuating device 36. Central rod 42 and plates 40a, 40b are interconnected via a plurality of angled or diagonal members or ribs 44, which, in the illustrated embodiment, angle outward and away from the piezoelectric actuating device and from the central rod 42 and to the respective one of the plates 40a, 40b. The exciter thus has a generally fish-bone shape of ribs extending outward at either end of the piezoelectric actuating device. The central rods and upper/lower plates and ribs may comprise various materials, such as metallic materials or plastic or polymeric materials (for example, the plates may comprise a metallic material, such as, for example, 1080 or 4130 steel or other suitable metallic material, or engineered plastics or other suitable high strength plastic or polymeric materials, while the ribs may comprise spring steel or stainless steel, such as, for example, 302 stainless steel or 1080 steel, or other suitable metallic material or suitable plastic or polymeric material), and the ribs may be attached to the central rods and upper/lower plates via various attachment means, such as via an adhesive or tape or the like, or via molding or the like, or via heat staking or soldering or the like, without affecting the scope of the present invention.

Figure 22:
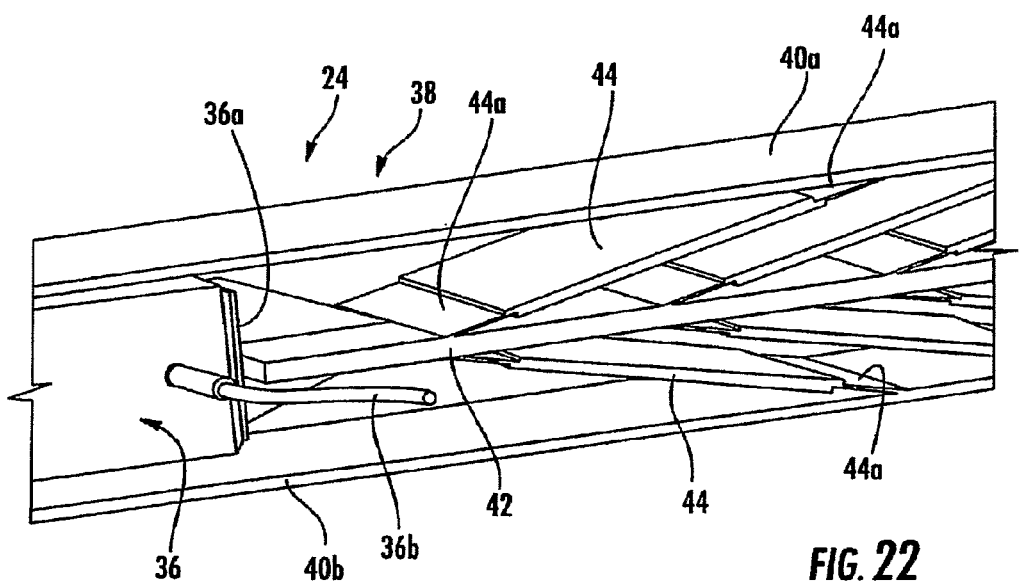
FIG. 22 is an enlarged perspective view of a portion of the exciter of FIG. 21.

As can be seen in FIG. 22, the ribs 44 may have narrowed cross sections at or near the attaching ends 44a of the ribs (where the ribs attach to the central rod 42 and the respective upper/lower plate 40a, 40b, so that the ribs 44 may readily flex at the narrowed regions to effectively pivot relative to the central rod and the plates 40a, 40b, as discussed below. In the illustrated embodiment, the exciter comprises an elastomeric exciter, with the upper and lower plates being approximately 0.5 mm thick or thereabouts and the central rod being approximately 1 mm thick or thereabouts. The diagonal members or ribs may be approximately 0.5 mm thick or thereabouts, with the narrowed or flexible or attachment regions being about 0.1 mm thick or thereabouts so as to provide enhanced flexibility at or near the ends of the ribs. However, other dimensions may be selected for the actuating and exciting elements depending on the desired performance characteristics of the exciter and piezoelectric actuating device and actuating assembly.

The inner ends of the central rods 42 are engaged with or attached to the end faces 36a of piezoelectric actuating device 36 so that movement of the end faces 36a imparts a corresponding longitudinal movement of the central rods 42. The inner ends of the rods 42 may be formed to correspond to the shape or form of the end faces of the piezoelectric actuating device, and may connect to or attach to the end faces (such as via a threaded type engagement or a snap type engagement or a ball and socket type engagement or the like) so that the longitudinal movement of the end faces is substantially translated to longitudinal movement of the central rods 42. The exciter functions to amplify the stroke of the piezoelectric actuating device and to divert the stroke toward and away from the window panel so as to function as a mechanical amplifying device or element that is responsive to the piezoelectric actuating device.

When mounted in the vehicle, the lower plate 40b of exciter 38 is fixedly secured to mounting bracket 34, which is fixedly secured to the vehicle frame portion or sheet metal, while the upper plate 40a of exciter 38 is adhered to or secured to the interior surface of the window panel 14. When so secured, movement of the plates along their longitudinal axes is limited by the attachment of the plates to the vehicle frame portion and window panel. As discussed above, longitudinal movement of the end faces 36a of piezoelectric actuating device 36 imparts a corresponding longitudinal movement of the central rods 42 of exciter 38. Because the upper and lower plates 40a, 40b are substantially fixedly attached to the window panel and vehicle frame, respectively, such longitudinal movement of the central rods 42 causes the ribs 44 to flex at their attachment areas 44a and to move the upper and lower plates 40a, 40b toward and away from one another. For example, when the end faces 36a of the piezoelectric actuating device 36 move outward and away from the piezoelectric actuating device, the central rods are also moved outward and away from the piezoelectric actuating device. Such outward movement of the central rods 42 relative to the fixed plates 40a, 40b causes the attachment areas 44a of the ribs to flex and for the ribs 44 to exert a force against the respective plates 40a, 40b to move the upper plate 40a outward away from the lower plate 40b so as to exert an outward force and motion against the window panel 14. Movement of the end faces 36a of the piezoelectric actuating device 36 in the inward longitudinal direction imparts a similar but opposite movement of the central rods 42 and plates 40a, 40b of the exciter 38. Ribs 44 thus pivot or flex to move the plates 40a, 40b toward and away from one another as the piezoelectric actuating device pulses to move the central rods inward and outward along the longitudinal axis of the exciter.

As can be seen with reference to FIGS. 7, 19A, 19B and 21, the piezoelectric actuating device 36 generates a stroke or pulse generally along the window panel at which it is positioned. The ribs and plates of the exciter are configured so that the pulse of the piezoelectric actuating device (of a distance of about 40 to 75 microns) may, for example, be transformed into a pulse of the upper plate 40a of about 0.5 mm, while the force exerted by the piezoelectric actuating device may be, for example, about 1500 to 2500 Newtons, which may be converted or transformed to a force of about 250 Newtons or about 180 to 320 Newtons exerted by the upper plate 40a at the window surface. The exciter 38 thus receives the pulse from the piezoelectric actuating device and imparts a corresponding and amplified pulse or stroke or movement in a direction that is generally normal to the pulse or stroke of the piezoelectric actuating device 36. The generally lateral or cross car pulse of the piezoelectric actuating device is thus converted into an outward or inward pulse at the lower portion of the window panel to cause the window panel to move outward and inward about the generally fixed upper perimeter portion of the window panel. The exciter thus takes the generally horizontal force and stroke of the piezoelectric actuating device and redirects it and amplifies the stroke to a generally vertical or partially vertical stroke at the window panel while reducing the force to a reduced generally vertical or partially vertical force at the window panel, so as to cause the window panel to move inward and outward or vibrate at the desired frequency as dictated by the audio system and the piezoelectric actuating device.

Optionally, other forms or types of exciters or force/pulse transfer devices may be implemented in conjunction with the actuating device without affecting the scope of the present invention. For example, and as shown in FIGS. 23-25, an exciter 38' (shown with piezoelectric actuator 36 in FIG. 25) may include an upper plate 40a', a lower plate 40b', a pair of generally central rods or members 42' and a plurality of ribs 44' pivotally connected to the rods 42' and plates 40a', 40b'. The ribs 44' may comprise metallic ribs or members having curved or rolled ends 44a', which are pivotally received within rounded or circular notches 41' (FIG. 26) formed across the opposed surfaces of the plates 40a', 40b' and rods 42'. The notches 41' may be spaced apart and formed across the opposed surfaces of the plates and rods (and across both sides of the rods), such as via extrusion of the plates or rods or via other forming means. The rolled ends 44a' of the ribs 44' may be inserted into the circular notches 41' so that the ribs 44' are pivotally attached to the plates 40a', 40b' and rods 42', whereby movement of the rods 42' in a longitudinal direction (such as a generally horizontal direction when the exciter is mounted in the vehicle) will cause the ribs 44' to pivot and cause a generally vertical movement of the upper plate 40a' relative to the lower plate 40b', such as in a similar manner as described above. The notches may include a bushing or bearing surface or the like (such as a Teflon coating or the like over an acetal material or the like) to enhance the pivotal movement of the ribs relative to the rods and plates.

As can be seen in FIGS. 23 and 24, the notches 41' may be formed substantially or entirely across the rods and plates, whereby the ribs may be inserted into and along the notches to pivotally attach the ribs to the rods and plates. The ribs 44' may be retained or secured within the circular notches 41' via a side plate or member 45a', 45b' that is attached along the side or sides of the plates 40a', 40b' and rods 42', respectively. For example, the side members 45a', 45b' may be secured to the respective rods and plates via one or more fasteners 45c', which may pass through the side members and may thread into threaded passageways 42a', 40c' in or across or partially across the respective rods 42' and plates 40a', 40b'.

Optionally, and as can be seen with reference to FIGS. 23-25, the upper plate 40a' and/or lower plate 40b' may be formed to generally correspond with the shape of the window panel or the shape of the mounting bracket or vehicle sheet metal, respectively. For example, upper plate 40a' is formed to have a thicker cross section at a central region so as to provide a curved upper attaching surface 40d' for attaching or adhering or bonding to a curved portion or surface of the window panel. As shown in FIGS. 23-25, the upper and lower plate portions 40a', 40b' may also include raised ribs or protrusions or dimples 40e' or the like at their attaching surfaces, such that the raised protrusions 40e' provide the desired bond layer thickness or adhesive layer thickness between the attaching surfaces of the exciter and the corresponding window panel or bracket or vehicle structure.

Optionally, and with reference to FIGS. 27-30, other forms or shapes or connections or joints for the ribs and plates/rods may be implemented in an exciter within the scope of the present invention. For example, and as shown in FIG. 27, ribs 144 may be substantially straight ribs that engage generally squared or rectangular shaped notches 141 in the rods 142 and the upper and lower plates (only upper plate 140a is shown in FIG. 27). The notches 141 may include a bushing material or element 143 to enhance pivotal movement of the ribs 144 relative to the rods 142 and plates. Optionally, and as shown in FIG. 28, the ends of the substantially straight ribs 144 may be received in walled notches 141' (which may include a bushing material or element 143'), and may pivot relative thereto so that the ribs 144 are pivotally attached to the respective rods/plates of the exciter. Optionally, and as shown in FIG. 29, the ends of bent ribs 244 (such as generally z-shaped ribs or elements) may be pivotally or movably received in correspondingly formed slots or notches 241, and may thus pivot relative to the rods/plates of the exciter. Optionally, and as shown in FIG. 30, the ribs 244' may be bent or angled at a central region of the ribs and may be received within one or more slots 241' formed through and partially across the central rods 242. The opposite ends of the ribs 244' may be pivotally received within appropriate notches in the upper and lower plates, such as in one of the manners described above. Optionally, the ribs may be received in slots along only one side of the central rod, depending on the particular application. The ribs may be secured within the slots via staking or soldering the fins to the metallic central rod and top/bottom plates. For example, the slots may be burned or otherwise formed or established (such as via electronic discharge machining (EDM) or the like) partially through the rods and plates, and the fins or ribs may be inserted into the slots and heat staked or soldered or otherwise secured (such as via laser welding or fusing or adhering or the like) therein.

Other forms of ribs, such as curved or preflexed ribs or ribs having end portions that are pivotally received in other shaped notches or the like in the plates and rods, may also or otherwise be implemented in the exciter, without affecting the scope of the present invention. The notches in the center rods may be correspondingly formed along the opposite sides or surfaces of the rods, or may be staggered (such as shown in FIG. 27), without affecting the scope of the present invention. The ribs may be retained within the respective notches via any retaining means, such as side plates along the upper and lower plates and rods or such as via pins or other retaining elements or the like inserted into the plates and/or rods or such as via an elastomeric coating or layer or the like overmolded at the notches and rib ends, in order to limit retraction of the ends of the ribs from the respective notches while allowing for pivotal movement of the ribs relative to the respective plates and rods. The ribs thus may be pivotally received in notches or passageways formed in the upper and lower plates and in the central rods or plates or members, so that the ribs may pivot and/or flex to expand and contract the exciter in response to longitudinal movement of the central rods.

Figure 31:
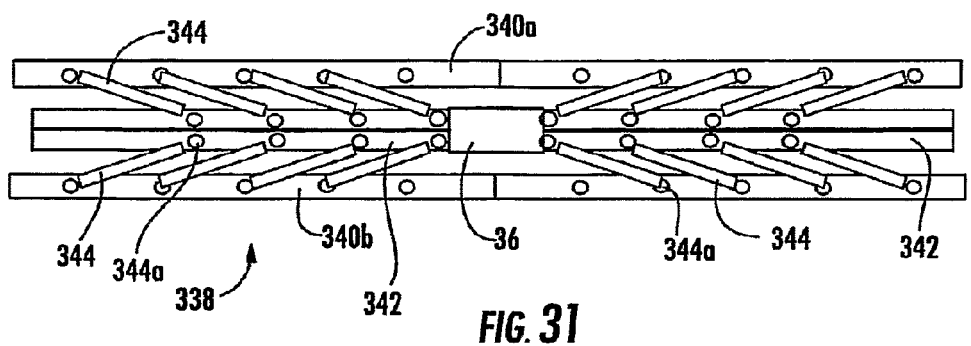
FIG. 31 is a side elevation of an exciter suitable for use with the actuating device and acoustic window assembly of the present invention.

Optionally, and as shown in FIG. 31, an exciter 338 may include a plurality of ribs 344 that are pivotally attached to the respective central rod 342 and the respective upper/lower plate 340a, 340b. The ribs may be pivotally attached via rivets or roll pins or other pin or axle attachment that allows for pivotal movement of the ribs relative to the central rod and the upper and lower plates 340a, 340b. The ribs 344 may be sufficiently rigid such that movement of the central rod 342 in the longitudinal direction causes the ribs to pivot at their attachment ends 344a so as to impart movement of the upper and lower plates 340a, 340b toward and away from one another, such as in a similar manner as described above.

Figure 32:
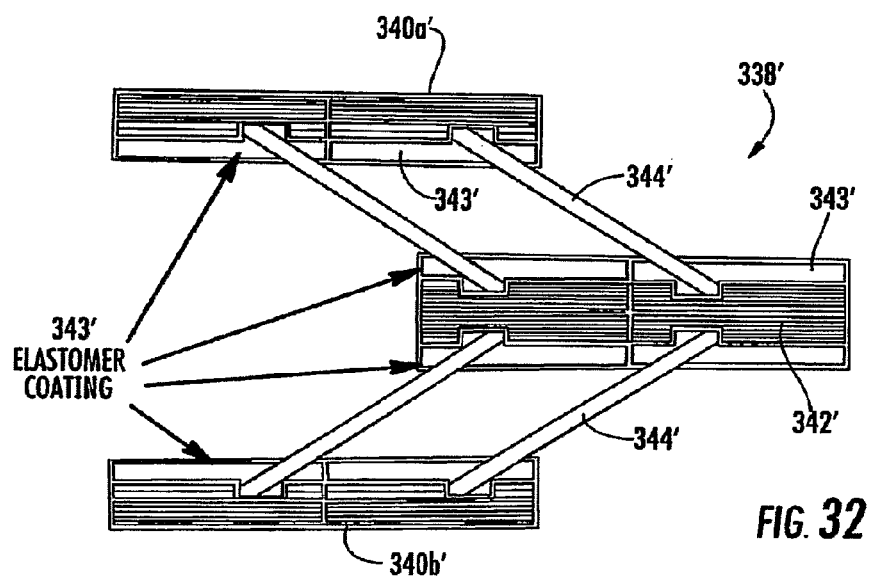
FIG. 32 is a side elevation of another exciter suitable for use with the actuating device and acoustic window assembly of the present invention.

Optionally, and with reference to FIG. 32, a molded exciter 338' may be provided that comprises molded central rods 342' and plates 340a', 340b' that are molded of a similar material, and that overmolds or coats the opposed surfaces of the plates and central rods with an elastomer coating 343', which retains the ribs 344' at the rods 342' and plates 340a', 340b'. The elastomer coating 343' may be molded over the rods and plates via a two shot molding process or a co-extrusion process or an over-molding or in-molding process, and allows for flexible attachment of the ribs at the rods and plates so that the ribs may flex or pivot to expand and contract the exciter in a manner similar to that described above.

Optionally, and with reference to FIGS. 33-34B, an exciter 438 may include a plurality of ribs 444 that are attached to the respective central rod 442 and the respective upper/lower plate 440a, 440b. In the illustrated embodiment, the ribs 444 are insert molded through the central rod 442 and into the upper and lower plates 440a, 440b. The ribs include corrugated or ribbed portions 444a between the central rod and respective plates so that the ribs are substantially non-flexible at those portions, whereby the flexing of the ribs occurs at the connections or joints at the attachment ends 444b, 444c of ribs 444 at the central rod and the upper and lower plates to facilitate pivotal movement of the ribs relative to the central rod and the upper and lower plates 440a, 440b. The corrugated ribs 444 thus are sufficiently rigid such that movement of the central rod 442 in the longitudinal direction causes the ribs to pivot at their attachment ends 444b, 444c so as to impart movement of the upper and lower plates 440a, 440b toward and away from one another, such as in a similar manner as described above. The inward end 442a of each central rod 442 may be formed or molded to define a receiving pocket or connector for engaging and/or receiving a respective end of the piezoelectric actuating device 436 to mount and/or support the piezoelectric actuating device at and between the central rods 442 of exciter 438.

The ribs 444 may be formed of any suitable material, such as spring steel or stainless steel or the like, and may be located at a mold for overmolding or insert molding (such as by injection molding or the like) of the plates and central rods at and at least partially over and around the appropriate portions of the ribs 444. For example, the ribs may be loaded in or located at a mold cavity for molding the central rod (such as out of a molded plastic or polymeric material, such as an engineered plastic or other suitable high strength plastic or polymeric material, such as, for example, a PBT and/or PET material, preferably with a high glass content, such as about a 50 percent glass filled PET material, or other suitable material) around and over a central portion 444d (FIG. 34A) of the ribs 444. The mold cavity may be closed and the central rod or rods may be formed or molded over the central portions 444d of ribs 444.

Optionally, the ribs may include a slot or notch 444e (FIG. 34A) for receiving a retaining element 445, which may be received in the slots 444e of the ribs 444 prior to molding the central rods over the ribs. Thus, when the central rods 442 are overmolded over the central portions 444d of ribs 444, the rods 442 will include the retaining element 445 therein and therealong, as can be seen in FIG. 34B. The ends of the retaining elements 445 may extend to the receiving ends 442a of rods 442 and may contact the respective ends of the piezoelectric actuating device 436, as can also be seen in FIG. 34B.

The outer ends 444c of ribs 444 are inserted or loaded into mold cavities and the upper and lower plates are molded with the ends 444c extending at least partially into the opposed surfaces of the upper and lower plates 440a, 440b in a similar manner as described above with respect to central rods 442. As can be seen in FIGS. 33 and 34B, the ends 444c are bent or curved so as to be substantially fixedly positioned or received in the upper and lower plates when the plates are molded over the ends 444c of ribs 444. The molding or injection molding of the central rod and upper/lower plates may be performed in separate molding steps or may be performed in a single or unitary mold process, without affecting the scope of the present invention.

Optionally, and with reference to FIGS. 35 and 36, an exciter 538 may include a pair of central rods 542 at respective ends of the piezoelectric actuating device 536 that engages respective upper/lower plates 540a, 540b. The central rods 542 include angled camming elements or surfaces 544 that engage correspondingly angled camming surfaces 541 of plates 540a, 540b, such that longitudinal movement of central rods 542 causes camming surfaces 544 to move or slide against and along camming surfaces 541 to impart a generally vertical movement to the upper and lower plates 540a, 540b in opposite directions. The camming surfaces 544, 541 may be formed to facilitate relatively smooth sliding movement therebetween. The central rods may be sufficiently rigid such that movement of the central rod 542 in the longitudinal direction causes the camming elements to slide along the camming surfaces so as to impart movement of the upper and lower plates 540a, 540b toward and away from one another, such as in a similar manner as described above. The inward ends 542a of central rods 542 may define receiving pockets or engaging surfaces for engaging and/or receiving the respective end of the piezoelectric actuating device 536 therein. The rods and plates of the exciter may comprise any suitable material, such as, for example, extruded aluminum or other suitable materials, without affecting the scope of the present invention.

Accordingly, the actuating assembly of the acoustic window assembly of the present invention utilizes a mechanical exciter or amplifying device to excite or vibrate the window panel in the desired direction and at a desired force and degree of vibration in response to the output of the piezoelectric actuating device. The mechanical exciter acts against the window panel along a portion or region of the window panel and at a lower region of the window panel so that the actuating assembly may be located at a region where it is not readily viewable by a person inside or outside of the vehicle cabin. The performance of the acoustic window assembly of the present invention thus is not so highly dependent on the precise location of the actuating assembly at the vehicle window panel, such that elongated actuators may be set in the general or desired position along the glass window panels. The present invention thus enables the acoustic window assemblies to be manufactured in production quantities without requiring testing of each individual window assembly to determine if the actuating assembly is attached to the window panel at a precise location requirement. The size and spacing of the actuating assembly and mechanical exciter are selected so as to provide the desired degree of force and stroke at the window panel so as to provide the desired or appropriate frequency of vibration of the window panel as dictated or driven by the audio system of the vehicle, without moving the window panel beyond the limitations or constraints of the window frame portion and/or the vehicle frame.

Therefore, the present invention provides an acoustic window assembly for a vehicle that vibrates the window panel while substantially sealing the window panel at the vehicle. The present invention provides an enhanced acoustical device for a vehicle sound system that utilizes a glass panel or window panel of a vehicle and thus does not interfere with the interior space of the vehicle cabin and/or other space at the cabin that may be utilized for other vehicle components or the like. The actuating assembly of the acoustic window assembly of the present invention includes an actuating device, such as a piezoelectric actuating device or the like, and a mechanical exciter, which engages the window panel and transfers the pulse of the actuating device along a region of the window panel to spread out the forces and movements/pulses at the window panel. The performance of the acoustic window assembly thus may not be so highly dependent on the precise location of the actuating assembly at the window panel as the acoustic devices of the prior art. Because the acoustic window assembly of the present invention may replace or supplement one or more speakers and/or subwoofers of a vehicle sound system, the acoustic window assembly may achieve a reduction in the weight of the vehicle, since the addition of the actuator assembly is more than offset by the reduction or removal of one or more speakers and/or subwoofers of the sound system. The acoustic window assembly of the present invention thus may provide a weight reduction and may require reduced space, and may require reduced power to operate, while providing enhanced performance of the acoustic window assembly and enhanced sealing of the window panel at the vehicle.

Changes and modifications to the specifically described embodiments may be carried out without departing from the principles of the present invention, which is intended to be limited only by the scope of the appended claims as interpreted according to the principles of patent law.

The invention claimed is:

1. A window assembly for a vehicle, said window assembly comprising:
   a frame portion;
     a window panel, said frame portion partially surrounding a perimeter of said window panel and leaving a free perimeter portion of said window panel at least partially free;
     an actuating assembly, said actuating assembly being positioned at or near said free perimeter portion of said window panel, said actuating assembly being operable to vibrate said window panel; and
     a seal along said free perimeter portion to substantially seal said window panel relative to the vehicle while allowing movement of said window panel in response to said actuating assembly.

2. The window assembly of claim 1, wherein said frame portion is fixedly secured to a fixed perimeter portion of said window panel.

3. The window assembly of claim 2, wherein said fixed perimeter portion is substantially opposite from said free perimeter portion.

4. The window assembly of claim 3, wherein said window assembly is configured to allow flexing along other perimeter portions of said window panel between said fixed perimeter portion and said free perimeter portion.

5. The window assembly of claim 1, wherein said window panel comprises a rear window of a vehicle.

6. The window assembly of claim 1, wherein said actuating assembly comprises a piezoelectrical actuator that is operable to vibrate at or near said free perimeter portion of said window panel.

7. The window assembly of claim 6, wherein said piezoelectrical actuator is operable to excite an exciter device that converts the vibration of said piezoelectrical actuator to a desired vibration or movement at said window panel.

8. The window assembly of claim 7, wherein said desired vibration comprises movement of said exciter device toward and away from said window panel to impart an inward movement and an outward movement of said window panel at said free perimeter portion of said window panel.

9. The window assembly of claim 8, wherein said piezoelectrical actuator is oriented to impart movement in a direction generally along said window panel and said exciter device imparts movement in a direction generally normal to said window panel in response to said piezoelectrical actuator.

10. The window assembly of claim 9, wherein said exciter device includes a mounting plate for attaching to the vehicle, a window attaching plate for attaching to said window panel, and an exciter element that imparts movement of said window attaching plate toward and away from said mounting plate in response to said piezoelectric actuator.

11. The window assembly of claim 8, wherein said seal along said free perimeter portion of said window panel substantially seals said window panel at the vehicle during the movement or vibration of said window panel.

12. The window assembly of claim 1 including a limiting element that limits outward movement of said window panel relative to the vehicle frame portion.

13. The window assembly of claim 12, wherein said limiting element is substantially fixedly attached at an interior surface of said window panel and is configured to be movably attached to the vehicle frame portion with a frame engaging portion that limits outward movement of said window panel relative to the vehicle frame portion.

* * * * *

UNITED STATES PATENT AND TRADEMARK OFFICE
CERTIFICATE OF CORRECTION

PATENT NO. : 8,180,065 B2  Page 1 of 1
APPLICATION NO. : 12/088560
DATED : May 15, 2012
INVENTOR(S) : Darin J. Snider It is certified that error appears in the above-identified patent and that said Letters Patent is hereby corrected as shown below:

On the Title Page, Item (57), in the Abstract:
Line 7, "operated" should be --operable--

Column 1
Lines 7-10, "The present application claims the benefit of U.S. provisional application Ser. No. 60/726,343, filed Oct. 13, 2005, which is hereby incorporated herein by reference in its entirety." should be --The present application is a 371 national phase application of PCT Application No. PCT/US2006/040100, filed Oct. 12, 2006, which claims the benefit of U.S. provisional application, Ser. No. 60/726,343, filed Oct. 13, 2005, which are hereby incorporated herein by reference in their entireties.--

Signed and Sealed this
Thirty-first Day of July, 2012

David J. Kappos
*Director of the United States Patent and Trademark Office*